United States Patent
Kawasaki et al.

(10) Patent No.: US 11,259,345 B2
(45) Date of Patent: Feb. 22, 2022

(54) USER EQUIPMENT, CONTROL APPARATUS, AND COMMUNICATION CONTROL METHOD

(71) Applicants: SHARP KABUSHIKI KAISHA, Sakai (JP); FG Innovation Company Limited, Tuen Mun (HK)

(72) Inventors: Yudai Kawasaki, Sakai (JP); Masafumi Aramoto, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 17/045,640

(22) PCT Filed: Apr. 9, 2019

(86) PCT No.: PCT/JP2019/015498
§ 371 (c)(1),
(2) Date: Oct. 6, 2020

(87) PCT Pub. No.: WO2019/198721
PCT Pub. Date: Oct. 17, 2019

(65) Prior Publication Data
US 2021/0136843 A1    May 6, 2021

(30) Foreign Application Priority Data

Apr. 9, 2018   (JP) ............................. JP2018-074588

(51) Int. Cl.
*H04W 76/12*      (2018.01)
*H04W 8/06*       (2009.01)
(Continued)

(52) U.S. Cl.
CPC ............. *H04W 76/12* (2018.02); *H04W 8/06* (2013.01); *H04W 28/0268* (2013.01);
(Continued)

(58) Field of Classification Search
CPC ... H04W 76/12; H04W 8/06; H04W 28/0268; H04W 28/24; H04W 36/14; H04W 60/02
(Continued)

(56) References Cited

U.S. PATENT DOCUMENTS 10,952,176 B2 *   3/2021  Bharatia ............... H04W 76/12
2016/0134398 A1 * 5/2016  Lopez .................. H04B 7/0669
                                                         370/329
(Continued)

FOREIGN PATENT DOCUMENTS

JP    2017-208794 A    11/2017
JP    2018-078358 A     5/2018
(Continued)

OTHER PUBLICATIONS

3GPP TS 23.502 V15.0.0 (Dec. 2017) 3rd Generation Partnership Project; Technical Specification Group Services and System Aspects; Procedures for the 5G System; Stage 2 (Release 15).
(Continued)

*Primary Examiner* — Nghi H Ly
(74) *Attorney, Agent, or Firm* — ScienBiziP, P.C.

(57) ABSTRACT

Provided is a communication method configured to allow a function of CIoT to be used even in a 5GS that supports a network-initiated configuration update procedure and a plurality of types of session and service continuities. Further provided is a communication method which configured to appropriately manage, by a user equipment, connection established between the user equipment and a network even in a case that a network-initiated change of a state of the user equipment has been performed. Thereby, the communication method for performing the function of CIoT in the 5GS and the communication method for performing a network-initiated procedure of changing the state of the user equipment are provided.

12 Claims, 8 Drawing Sheets

(51) Int. Cl.
| | |
|---|---|
| *H04W 28/02* | (2009.01) |
| *H04W 28/24* | (2009.01) |
| *H04W 36/14* | (2009.01) |
| *H04W 60/02* | (2009.01) |

(52) U.S. Cl.
CPC ........... *H04W 28/24* (2013.01); *H04W 36/14* (2013.01); *H04W 60/02* (2013.01)

(58) Field of Classification Search
USPC ................ 370/329, 328, 338, 341, 345, 350
See application file for complete search history.

(56) References Cited

U.S. PATENT DOCUMENTS

| | | | |
|---|---|---|---|
| 2016/0157276 A1* | 6/2016 | Kim ...................... | H04W 76/10 455/450 |
| 2019/0150219 A1* | 5/2019 | Wang ................ | H04W 36/0033 370/329 |

FOREIGN PATENT DOCUMENTS

| | | |
|---|---|---|
| WO | 2017/126558 A1 | 7/2017 |
| WO | 2017/141749 A1 | 8/2017 |

OTHER PUBLICATIONS

3GPP TR 23.720 V13.0.0 (Mar. 2016) 3rd Generation Partnership Project; Technical Specification Group Services and System Aspects; Study on architecture enhancements for Cellular Internet of Things (Release 13).

* cited by examiner

USER EQUIPMENT, CONTROL APPARATUS, AND COMMUNICATION CONTROL METHOD

FIELD

The present disclosure is related to a user equipment (UE), a control apparatus, and a communication control method. This application claims priority based on JP 2018-74588 filed on Apr. 9, 2018 in Japan, the contents of which are incorporated herein in its entirety by reference.

BACKGROUND ART

In the 3rd generation partnership project (3GPP), studies have begun on the system architecture for a next generation, specifically the system architecture for a 5G system (5GS), a 5th generation (5G) mobile communication system, and discussions on support for new procedures and new functions have been conducted (see Non-Patent Literature 1 and Non-Patent Literature 2). Further, discussions for supporting functions for cellular Internet of Things (IoT) (CIoT), which is supported in an evolved packet system (EPS), (optimization of signaling for implementing efficiency of control signals and efficient communication of user data such as small data and short message service (SMS)) in a 5GS mobile communication system have begun (see Non-Patent Literature 3).

CITATION LIST

Non-Patent Literature

Non-Patent Literature 1: 3GPP TS 23.501 v15.1.0 (2018-03); Technical Specification Group Services and System Aspects; System Architecture for the 5G System; Stage 2 (Release 15).
Non-Patent Literature 2: 3GPP TS 23.502 v15.1.0 (2018-03); Technical Specification Group Services and System Aspects; Procedures for the 5G System; Stage 2 (Release 15).
Non-Patent Literature 3: 3GPP TR 23.724 v0.2.0 (2018-03); Technical Specification Group Services and System Aspects; Study on Cellular IoT support and evolution for the 5G System (Release 16).

SUMMARY

In 5G systems (5GSs), a 5G core network (5GC) which is a new core network has been discussed in order to provide various services. The study of functions for CIoT, which is supported by EPS, (optimization of signaling for implementing efficiency of control signals and efficient communication of user data such as small data and SMS) has also been initiated.

In a 5GS, new procedures such as a network-initiated configuration update procedure and new functions such as a plurality of types of session and service continuity and connection to a local area data network (LADN) are supported. However, in a case that functions for CIoT supported in an EPS are implemented in a 5GS, it is not clear how new procedures or new functions will be used to implement the functions for CIoT, which is supported in the EPS and in the 5GS. In a network-initiated configuration update procedure, which is a new procedure, it is also not clear how to change the state of a user equipment.

The present disclosure is in view of the above-described circumstances, and an object thereof is to provide a method of implementing a function for CIoT in a 5GS and a method of implementing a network-initiated procedure of changing the state of a user equipment.

A user equipment according to an embodiment of the present disclosure includes a controller, a transceiver, and a storage medium, in which the controller, in a registration procedure, determines Cellular Internet of Things 5G System optimization (Cellular IoT 5G System optimization (CIoT 5GS optimization)) for use to be control plane CIoT 5GS optimization, with a core network; the controller, in a Protocol Data Unit (PDU) session establishment procedure performed after completion of the registration procedure, establishes a PDU session with the core network; the transceiver, in a user equipment (UE) configuration update procedure to be performed after completion of the PDU session establishment procedure, receives a configuration update command message including information A from the core network, and transmits a configuration update complete message to the core network, the controller changes the CIoT 5GS optimization from the control plane CIoT 5GS optimization to the user plane CIoT 5GS optimization, based on reception of the configuration update command message, and the information A is information indicating the user plane CIoT 5GS optimization.

A control apparatus according to an embodiment of the present disclosure includes a controller, a transceiver, and a storage medium, in which the controller, in a registration procedure, determines Cellular Internet of Things 5th generation System optimization (Cellular IoT 5G System optimization (CIoT 5GS optimization)) for use to be control plane CIoT 5GS optimization, with a user equipment; the controller, in a Protocol Data Unit (PDU) session establishment procedure to be performed after completion of the registration procedure, establishes a PDU session with the user equipment; the transceiver, in a user equipment (UE) configuration update procedure to be performed after completion of the PDU session establishment procedure, transmits a configuration update command message including information A, to the user equipment, and receives a configuration update complete message from the user equipment, the controller changes the CIoT 5GS optimization from the control plane CIoT 5GS optimization to the user plane CIoT 5GS optimization, based on reception of the configuration update complete message, and the information A is information indicating the user plane CIoT 5GS optimization.

A communication control method for a user equipment according to an embodiment of the present disclosure includes the steps comprising: in a registration procedure, determining cellular Internet of things 5th generation system optimization (Cellular IoT 5G System optimization (CIoT 5GS optimization)) for use to be control plane CIoT 5GS optimization, with a core network; in a Protocol Data Unit (PDU) session establishment procedure, establishing a PDU session with the core network; in a UE configuration update procedure, receiving a configuration update command message including information A, from the core network, transmitting a configuration update complete message to the core network, and changing the CIoT 5GS optimization from the control plane CIoT 5GS optimization to the user plane CIoT 5GS optimization, based on reception of the configuration update command message, wherein the information A is information indicating the user plane CIoT 5GS optimization.

A communication control method for a control apparatus according to an embodiment of the present disclosure includes the steps comprising: in a registration procedure, determining cellular Internet of Things 5th generation system optimization (Cellular IoT 5G System optimization (CIoT 5GS optimization)) for use to be control plane CIoT 5GS optimization, with a user equipment; in a Protocol Data Unit (PDU) session establishment procedure, establishing a PDU session with the user equipment; in a UE configuration update procedure, transmitting a configuration update command message including information A, to the user equipment, and receiving a configuration update complete message from the user equipment, and changing the CIoT 5GS optimization from the control plane CIoT 5GS optimization to the user plane CIoT 5GS optimization, based on reception of the configuration update complete message, wherein the information A is information indicating the user plane CIoT 5GS optimization.

Advantageous Effects of Invention

According to the present disclosure, it is possible to use a function for CIoT in a 5GS even in a case that the 5GS supports a network-initiated configuration update procedure and a plurality of types of session and service continuities. Further, according to the present disclosure, it is possible to appropriately manage connection even in a case where a network-initiated change in the state of a user equipment is performed.

DESCRIPTION OF EMBODIMENTS

Preferred implementations of the present disclosure will be disclosed subsequently with reference to the drawings.

1. Outline of System

Figure 1:
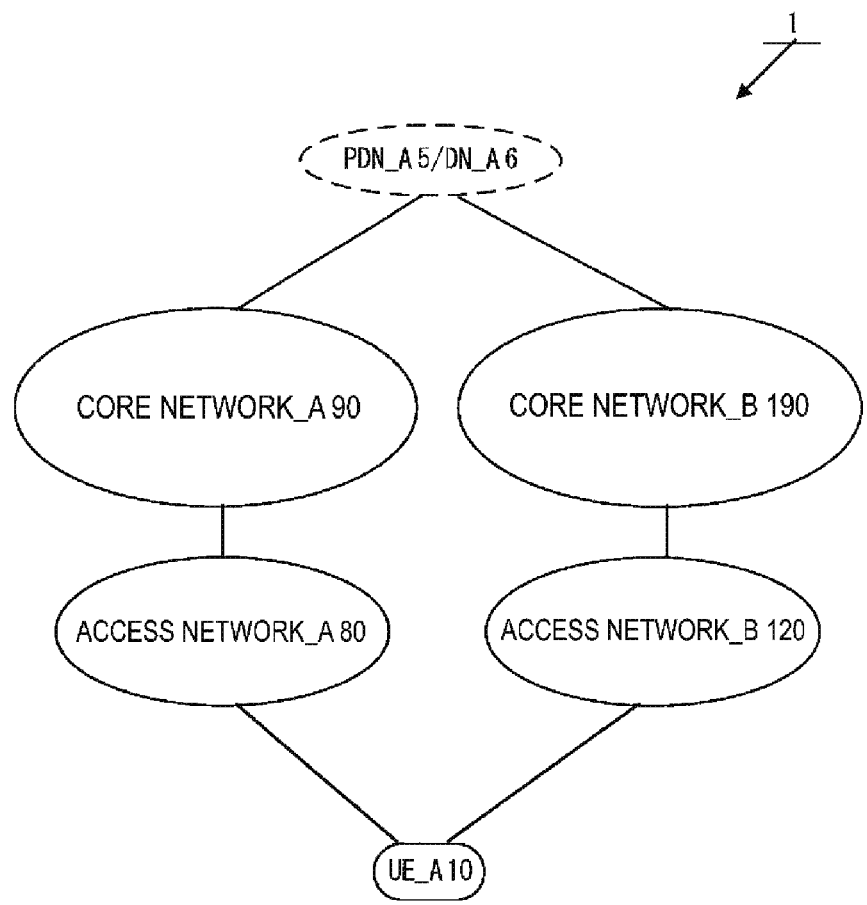
FIG. 1 illustrates an outline of a mobile communication system according to an implementation of the present disclosure.
Figure 2:
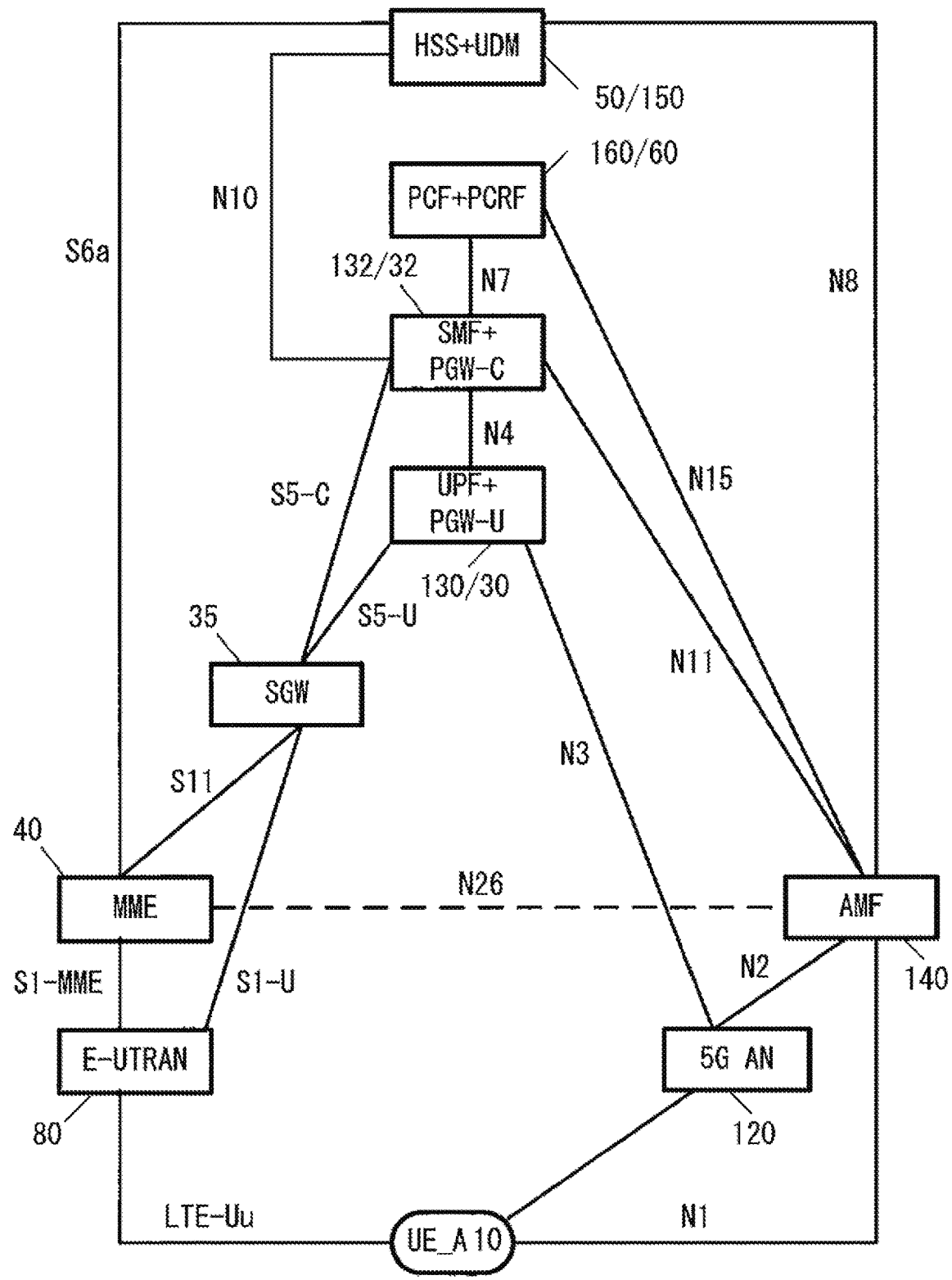
FIG. 2 illustrates a detailed configuration of a mobile communication system according to an implementation of the present disclosure.

First, FIG. 1 illustrates an outline of a mobile communication system 1 (e.g., an EPS or a 5GS) according to an implementation of the present disclosure. FIG. 2 illustrates a detailed configuration of the mobile communication system 1 according to an implementation of the present disclosure.

As illustrated in FIG. 1, the mobile communication system 1 includes a UE_A 10, an access network_A 80, a core network_A 90, a packet data network (PDN)_A 5, an access network_B 120, a core network_B 190, and a data network (DN)_A 6.

In the following disclosure, reference numerals of these apparatuses and functions may be omitted like a UE, an access network_A, a core network_A, a PDN, an access network_B, a core network_B, a DN, and the like.

In addition, FIG. 2 illustrates apparatuses and functions such as a UE_A 10, an E-UTRAN 80, a mobile management entity (MME) 40, a serving gateway (SGW) 35, a PGW-U 30, a packet data network gateway (PGW)-U 32, a policy and charging rules function (PCRF) 60, a home subscriber server (HSS) 50, a 5G Access Network (AN) 120, an AMF 140, a UPF 130, an SMF 132, a policy control function (PCF) 160, and a unified data management (UDM) 150, and an interface that connects these apparatuses and functions to each other. In the following disclosure, reference numerals of these apparatuses and functions may be omitted like a UE, an E-UTRAN, an MME, an SGW, a PGW-U, a PGW-C, a PCRF, an HSS, a 5G AN, an AMF, a UPF, an SMF, a PCF, a UDM, and the like.

An evolved packet system (EPS), which is a 4G system, is configured to include an access network_A and a core network_A, but may further include a UE and/or a PDN. A 5G system (5GS), which is a 5G system, is configured to include a UE, an access network_B, and a core network_B, but may further include a DN.

The UE is an apparatus capable of connection to a network service via a 3GPP access (also referred to as a 3GPP access network or a 3GPP AN) and/or a non-3GPP access (also referred to as a non-3GPP access or a non-3GPP AN). The UE may be a terminal apparatus capable of performing wireless communication such as a mobile phone or a smartphone, or may be a terminal apparatus capable of connection to an EPS and/or a 5GS. The UE may include a universal integrated circuit card (UICC) and an embedded UICC (eUICC). The UE may be expressed as a user equipment or may be expressed as a terminal apparatus.

The access network_A corresponds to an evolved universal terrestrial radio access network (E-UTRAN) and/or a wireless local area network (LAN) access network. One or more evolved node Bs (eNBs) are deployed in the E-UTRAN. In the following disclosure, the reference numerals of the eNB may be omitted as in eNB. In a case where there are a plurality of eNBs, the eNBs are connected to each other via, for example, an X2 interface. In addition, one or more access points are located in a wireless LAN access network.

The access network_B corresponds to a 5G access network (5G AN). The 5G AN includes a next-generation (NG) radio access network (RAN) and/or a non-3GPP access network. One or more gNBs (new radio (NR) node Bs) are deployed in the NG-RAN. In the following disclosure, the reference numeral of the gNB may be omitted like an eNB. The gNB is a node that provides a new radio (NR) user plane and a control plane to the UE and is a node connected to a 5GC via an NG interface (including an N2 interface or an N3 interface). The gNB is a base station apparatus which is newly designed for a 5GS and has different functions from those of a base station apparatus (eNB) used in an EPS which is a 4G system. In a case where there are a plurality of gNBs, the gNBs are connected to each other via, for example, an Xn interface.

An E-UTRAN and an NG-RAN may be referred to as a 3GPP access. A wireless LAN access network and a non-3GPP AN may be referred to as a non-3GPP access. Further, nodes deployed in the access network_B may also be collectively referred to as an NG-RAN node.

An access network_A, an access network_B, an apparatus included in the access network_A, and/or an apparatus included in the access network_B may be referred to as an access network or an access network apparatus.

A core network_A corresponds to an evolved packet core (EPC). A mobile management entity (MME), a serving gateway (SGW), a packet data network gateway (PGW)-U, a PGW-C, a policy and charging rules function (PCRF), a home subscriber server (HSS), and the like, for example, are deployed in the EPC.

The core network_B corresponds to a 5G core network (5GC). In the 5GC, for example, an access and mobility management function (AMF), a user plane function (UPF), a session management function (SMF), a policy control function (PCF), a unified data management (UDM), and the like are included in the 5GC.

A core network_A, a core network_B, an apparatus included in the core network_A, and/or an apparatus included in the core network_B may be referred to as a core network or a core network apparatus.

The core network (the core network_A and/or the core network_B) may be an internet protocol (IP) mobile communication network operated by a mobile network operator (MNO) that connects an access network (the access network_A and/or the access network_B) and a PDN and/or a data network (DN) to each other, may be a core network for a mobile network operator that operates and manages the mobile communication system 1, or may be a core network for a virtual mobile communication operator or a virtual mobile communication service operator such as a mobile virtual network operator (MVNO) and a mobile virtual network enabler (MVNE).

Although FIG. 1 illustrates a case where a PDN and a DN are the same as each other, the PDN and the DN may be different from each other. The PDN may be a data network (DN) for providing a communication service to a UE. The DN may be configured as a packet data service network or configured for each service. The PDN may include a connected communication terminal. Therefore, connection to the PDN may be connection to a communication terminal or a server apparatus deployed in the PDN. The transmission and/or reception of user data to and/or from the PDN may be the transmission and/or reception of the user data to and/or from the communication terminal or the server apparatus deployed in the PDN. The PDN may be expressed as a DN, or the DN may be expressed as a PDN.

At least some of an access network_A, a core network_A, a PDN, an access network_B, a core network_B, and a DN, and/or one or more apparatuses included in the networks may be referred to as a network or a network apparatus. The transmission and/or reception of a message and the execution of a procedure by the network and/or the network apparatus mean the transmission and/or reception of the message and/or the execution of the procedure by at least some of the access network_A, the core network_A, the PDN, the access network_B, the core network_B, and the DN, and/or one or more apparatuses included in the networks.

The UE can be connected to the access network. Additionally, the UE can be connected to the core network via the access network. The UE can be connected to the PDN or the DN via the access network and the core network. The UE can transmit and/or receive (communicate) user data to and/or from the PDN or the DN. In a case that the user data is transmitted and/or received, not only internet protocol (IP) communication but also non-IP communication may be used.

IP communication is data communication using an IP, and the transmission and/or reception of data is performed by an IP packet. The IP packet is constituted of an IP header and a payload portion. The payload portion may include data transmitted and/or received by apparatuses and functions included in an EPS and apparatuses and functions included in a 5GS. In addition, non-IP communication is data communication that does not use an IP, and data is transmitted and/or received in a different format from the structure of an IP packet. For example, the non-IP communication may be data communication implemented via the transmission and/or reception of application data which does not include an IP header, or may be communication for transmitting and/or receiving user data transmitted and/or received by a UE by giving another header such as a MAC header and an Ethernet (registered trademark) frame header.

2. Configurations of Devices

Next, configurations of apparatuses (a UE, an access network apparatus, and/or a core network apparatus) used in the implementations will be disclosed using the drawings. Each of the apparatuses may be configured as physical hardware, may be configured as logical (virtual) hardware configured on general-purpose hardware, or may be configured as software. At least some of the functions of the apparatuses may be configured as physical hardware, logical hardware, and software.

In addition, storage media (a storage medium_A 340, a storage medium_B 540, and a storage medium_B 740) in apparatuses and functions to be disclosed subsequently include, for example, a semiconductor memory, a solid-state drive (SSD), a hard disk drive (HDD), or the like. The storage media can store not only information originally configured in the manufacture stage but also various information transmitted and/or received between apparatuses and functions (for example, a UE, and/or an access network apparatus, and/or a core network apparatus, and/or a PDN, and/or a DN) other than their own apparatuses and functions. Further, the storage media can store identification information, control information, a flag, a parameter, and the like included in a control message which is transmitted and/or received in various communication procedures to be described later. In addition, each of the storage media may store this information for each UE. In a case where interworking is performed between a 5GS and an EPS, each of the storage media can store a control message and user data transmitted and/or received between apparatuses and functions included in the 5GS and/or the EPS. In this case, not only information transmitted and/or received via an N26 interface but also information transmitted and/or received without going via an N26 interface can be stored.

2.1. Device Configuration of UE

Figure 3:
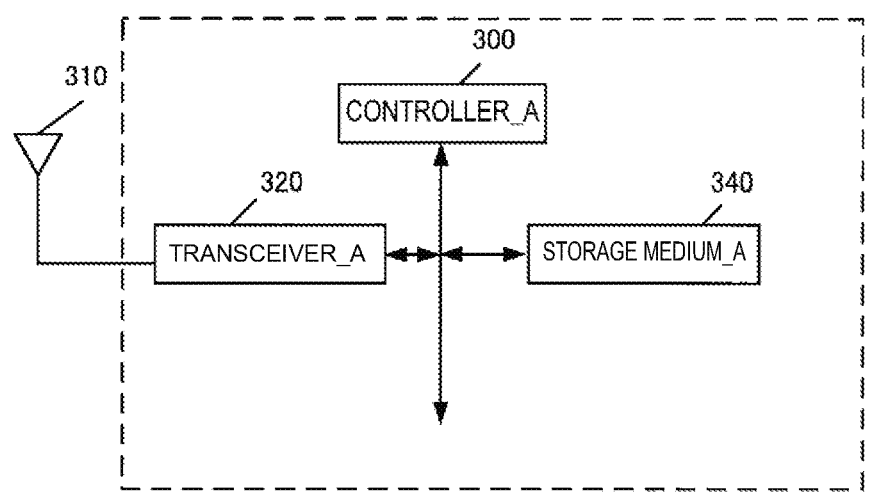
FIG. 3 illustrates an apparatus configuration of a UE according to an implementation of the present disclosure.

An example of an apparatus configuration of the user equipment (UE) will be disclosed with reference to FIG. 3. FIG. 3 illustrates an apparatus configuration of a UE according to an implementation of the present disclosure. The UE includes a controller_A 300, an antenna 310, a transceiver_A 320, and a storage medium_A 340. The controller_A 300, the transceiver_A 320, and the storage medium_A 340 are connected to each other via a bus. The transceiver_A 320 is connected to the antenna 310.

The controller_A 300 is a functional unit for controlling operations and functions of the entire UE. The controller_A 300 implements various processes in the UE by reading and executing various programs stored in the storage medium_A 340 as necessary.

The transceiver_A 320 is a functional unit for wirelessly communicating with a base station apparatus (eNB or gNB) in an access network via the antenna. The UE can transmit and/or receive user data and/or control information to and/or from the access network apparatus, the core network apparatus, the PDN, and/or the DN by using the transceiver_A 320.

As illustrated in FIG. 3, the UE can communicate with the base station apparatus (eNB) in the E-UTRAN via an LTE-Uu interface by using the transceiver_A 320. The UE may communicate with a base station apparatus (gNB) in the 5G AN by using the transceiver_A 320. The UE can transmit and/or receive an AMF and a non-access-stratum (NAS) message via an N1 interface by using the transceiver_A 320. However, the N1 interface is a logical interface, and thus communication between the UE and the AMF is actually performed via the 5G AN.

The storage medium_A 340 is a functional unit for storing programs, user data, control information, and the like that are necessary for operations of the UE.

2.2. Device Configuration of gNB

Figure 4:
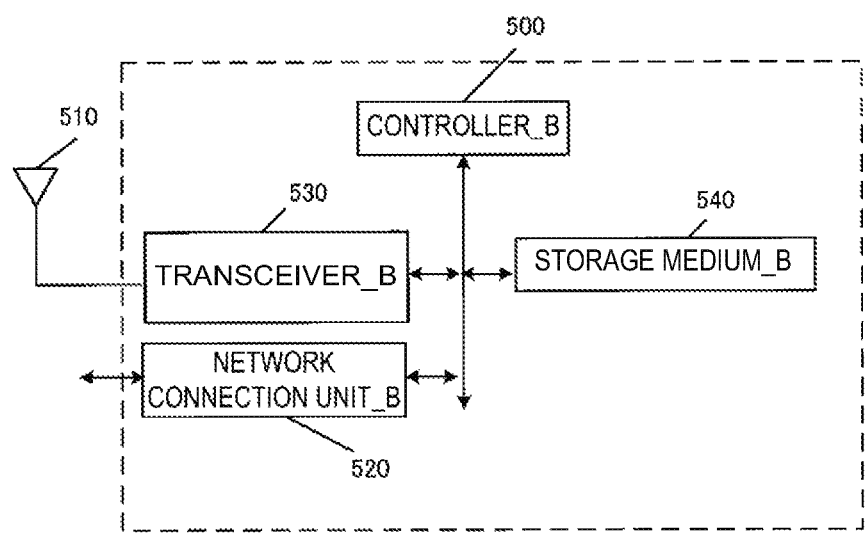
FIG. 4 illustrates a configuration of an access network apparatus in a 5GS. according to an implementation of the present disclosure.

An example of an apparatus configuration of the gNB will be disclosed with reference to FIG. 4. FIG. 4 illustrates a configuration of an access network apparatus (e.g., gNB) in a 5GS. according to an implementation of the present disclosure. The gNB includes a controller_B 500, an antenna 510, a network connection unit_B 520, a transceiver_B 530, and a storage medium_B 540. The controller_B 500, the network connection unit_B 520, the transceiver_B 530, and the storage medium_B 540 are connected to each other via a bus. The transceiver_B 530 is connected to the antenna 510.

The controller_B 500 is a functional unit for controlling operations and functions of the entire gNB. The controller_B 500 implements various processes in the gNB by reading and executing various programs stored in the storage medium_B 540 as necessary.

The network connection unit_B 520 is a functional unit for the gNB to communicate with the AMF and/or the UPF. The gNB can transmit and/or receive user data and/or control information to and/or from the AMF and/or the UPF by using the network connection unit_B 520.

The transceiver_B 530 is a functional unit for wirelessly communicating with the UE via the antenna 510. The gNB can transmit and/or receive user data and/or control information to and/or from the UE by using the transceiver_B 530.

As illustrated in FIG. 2, the gNB within the 5G AN can communicate with the AMF via the N2 interface and communicate with the UPF via the N3 interface by using the network connection unit_B 520. The gNB can communicate with the UE by using the transceiver_B 530.

The storage medium_B 540 is a functional unit for storing programs, data, control information, and the like that are necessary for operations of the gNB.

2.3. Device Configuration of AMF

Figure 5:
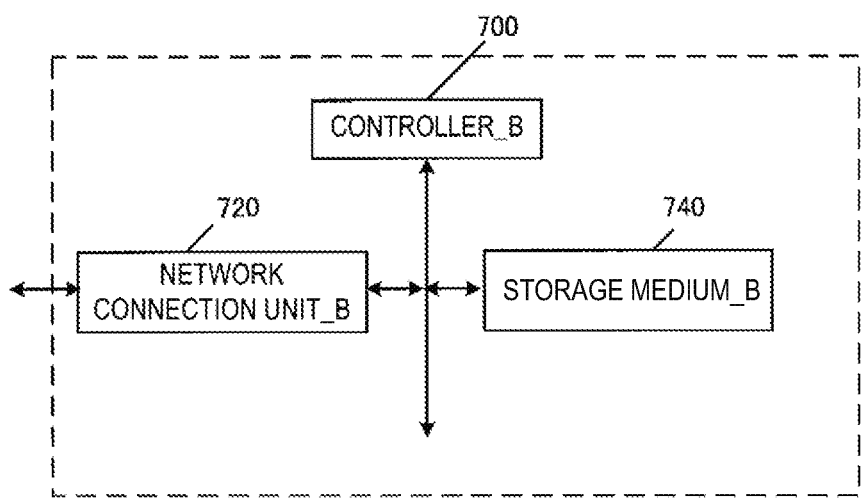
FIG. 5 illustrates a configuration of a core network apparatus (access and mobility management function (AMF)/session management function (SMF)/user plane function (UPF)) in a 5GS according to an implementation of the present disclosure.

An example of an apparatus configuration of the AMF will be disclosed with reference to FIG. 5. FIG. 5 illustrates a configuration of a core network apparatus (access and mobility management function (AMF)/session management function (SMF)/user plane function (UPF)) in a 5GS according to an implementation of the present disclosure. As illustrated in FIG. 5, the AMF includes a controller_B 700, a network connection unit_B 720, and a storage medium_B 740. The controller_B 700, the network connection unit_B 720, and the storage medium_B 740 are connected to each other via a bus. The AMF may be a node that deals with a control plane.

The controller_B 700 is a functional unit for controlling operations and functions of the entire AMF. The controller_B 700 implements various processes in the AMF by reading and executing various programs stored in the storage medium_B 740 as necessary.

The network connection unit_B 720 is a functional unit for connection of the AMF to the base station apparatus (gNB), the SMF, the PCF, the UDM, and/or the SCEF in the 5G AN. The AMF can transmit and/or receive user data and/or control information to and/or from the base station apparatus (gNB), the SMF, the PCF, the UDM, and/or the SCEF in the 5G AN by using the network connection unit_B 720.

As illustrated in FIG. 2, the AMF in the 5GC can communicate with the gNB via the N2 interface, communicate with the UDM via an N8 interface, communicate with the SMF via an N11 interface, and communicate with the PCF via an N15 interface by using the network connection unit_B 720 The AMF may transmit and/or receive the UE and a NAS message via the N1 interface by using the network connection unit_B 720. However, the N1 interface is a logical interface, and communication between the UE and the AMF is performed via the 5G AN. In addition, in a case where the N26 interface is supported, the AMF can communicate with the MM E via the N26 interface by using the network connection unit_B 720.

The storage medium_B 740 is a functional unit storing programs, user data, control information, and the like that are necessary for operations of the AMF.

The AMF may have the following functions comprising a function of exchanging a control message with the RAN using the N2 interface, a function of exchanging a NAS message with the UE using the N1 interface, a function of performing encoding and integrity protection of a NAS message, a registration management (RM) function, a connection management (CM) function, a reachability management function, a mobility management function of the UE or the like, a function of transferring of a session management (SM) message between the UE and the SMF, an access authentication or access authorization function, a security anchor (SEA) functionality function, a security context management (SCM) function, a function of supporting the N2 interface for a non-3GPP interworking function (N3IWF), a function of supporting the transmission and/or reception of a NAS signal to and/or from the UE via the N3IWF, a function of authenticating the UE connected via the N3IWF, and the like.

In the registration management function, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in a network, and thus the AMF cannot reach the UE because UE context in the AMF does not have valid positional information and routing information for the UE. In the RM-REGISTERED state, the UE is registered in a network, and the UE can receive services that require registration with the network. The RM state may be expressed as a 5GMM state. The RM-DEREGISTERED state may be expressed as a 5GMM-DEREGISTERED state, or the RM-REGISTERED state may be expressed as a 5GMM-REGISTERED state.

The 5GMM-REGISTERED state may be a state where the apparatuses have established 5GMM context, or may be a state where the apparatuses have established PDU session context. In a case where the apparatuses are in a 5GMM-REGISTERED state, the UE_A 10 may initiate to transmit and/or receive user data or a control messages or may respond to paging. In a case where the apparatuses are in a 5GMM-REGISTERED state, the UE_A 10 may execute registration procedures other than the registration procedure for initial registration, and/or a service request procedure.

The 5GMM-DEREGISTERED state may be a state where the apparatuses have not established 5GMM context, may be a state where positional information of the UE_A 10 is not ascertained in a network, or may be a state where a network cannot reach the UE_A 10. In a case where the apparatuses are in a 5GMM-DEREGISTERED state, the UE_A 10 may initiate a registration procedure, or may establish 5GMM context by executing the registration procedure.

In connection management, a CM state for each UE is managed. The CM state may be synchronized between the UE and the AMF. The CM state includes a disconnected state (CM-IDLE state) and a connected state (CM-CONNECTED state). In the CM-IDLE state, the UE is in an RM-REGISTERED state but does not have a NAS signaling connection established between the AMF and the UE via the N1 interface. In the CM-IDLE state, the UE does not have a connection of the N2 interface (N2 connection) and a connection of the N3 interface (N3 connection). On the other hand, in the CM-CONNECTED state, the UE has a NAS signaling connection established between the AMF and the UE via the N1 interface. In the CM-CONNECTED state, the UE may have a connection to the N2 interface (N2 connection) and/or a connection to the N3 interface (N3 connection).

The connection management may be performed separately according to a CM state in 3GPP access and a CM state in non-3GPP access. The CM state in 3GPP access may include a disconnected state in 3GPP access (CM-IDLE state over 3GPP access) and a connected state in 3GPP access (CM-CONNECTED state over 3GPP access). The CM state in non-3GPP access includes a disconnected state in non-3GPP access (CM-IDLE state over non-3GPP access) and a connected state in non-3GPP access (CM-CONNECTED state over non-3GPP access). A disconnected state may be expressed as an idle mode, and a connected state mode may be expressed as a connected mode.

The CM state may be expressed as a 5GMM mode. The disconnected state may be expressed as a 5GMM disconnected mode (5GMM-IDLE mode), or the connected state may be expressed as a 5GMM connected mode (5GMM-CONNECTED mode). The disconnected state in 3GPP access may be expressed as a 5GMM disconnected mode in 3GPP access (5GMM-IDLE mode over 3GPP access), and the connected state in 3GPP access may be expressed as a 5GMM connected mode in 3GPP access (5GMM-CONNECTED mode over 3GPP access). The disconnected state in non-3GPP access may be expressed as a 5GMM disconnected mode in non-3GPP access (5GMM-IDLE mode over non-3GPP access), and the connected state in non-3GPP access may be expressed as a 5GMM connected mode in non-3GPP access (5GMM-CONNECTED mode over non-3GPP access). The 5GMM disconnected mode may be expressed as an idle mode, and the 5GMM connected mode may be expressed as a connected mode.

In addition, one or more AMFs may be included within the core network_B. The AMF may be a network function (NF) that manages one or more network slice instances (NSI). The AMF may be a common control plane (CP) function (common CP network function (CPNF); common control network function (CCNF) which is shared among a plurality of NSIs.

The N3IWF is an apparatus and/or a function which is deployed between the non-3GPP access and the 5GC in a case where the UE is connected to the 5GS via the non-3GPP access.

2.4. Device Configuration of SMF

An example of an apparatus configuration of the SMF will be disclosed with reference to FIG. 5. The SMF includes a controller_B 700, a network connection unit_B 720, and a storage medium_B 740. The controller_B 700, the network connection unit_B 720, and the storage medium_B 740 are connected to each other via a bus. The SMF may be a node that deals with a control plane.

The controller_B 700 is a functional unit for controlling operations and functions of the entire SMF. The controller_B 700 implements various processes in the SMF by reading and executing various programs stored in the storage medium_B 740 as necessary.

The network connection unit_B 720 is a functional unit for the SMF to be connected to the AMF, the UPF, the PCF, and/or the UDM. The SMF can transmit and/or receive user data and/or control information to and/or from the AMF, the UPF, the PCF, and/or the UDM by using the network connection unit_B 720.

As illustrated in FIG. 2, the SMF in the 5GC can communicate with the AMF via the N11 interface, communicate with the UPF via an N4 interface, communicate with the PCF via an N7 interface, and communicate with the UDM via an N10 interface by using the network connection unit_B 720.

The storage medium_B 740 is a functional unit for storing programs, user data, control information, and the like that are necessary for operations of the SMF.

The SMF has a session management function such as establishment, modification, and release of a PDU session, IP address allocation for the UE and the management function thereof, a UPF selection and control function, a UPF configuration function for routing traffic to an appropriate destination (transmission destination), a function of transmitting and/or receiving an SM portion of a NAS message, a function of giving notification that downlink data has arrived (downlink data notification), a function of providing SM information specific to an AN (for each AN) and transmitted to the AN via the N2 interface via the AMF, a function of determining a session and service continuity mode (SSC mode) for a session, a roaming function, and the like.

2.5. Device Configuration of UPF

An example of an apparatus configuration of the UPF will be disclosed with reference to FIG. 5. The UPF includes the controller_B 700, the network connection unit_B 720, and the storage medium_B 740. The controller_B 700, the network connection unit_B 720, and the storage medium_B 740 are connected to each other via a bus. The UPF may be a node that deals with a control plane.

The controller_B 700 is a functional unit for controlling operations and functions of the entire UPF. The controller_B 700 implements various processes in the UPF by reading and executing various programs stored in the storage medium_B 740 as necessary.

The network connection unit_B 720 is a functional unit for the UPF to be connected to the base station apparatus (gNB), the SMF, and/or the DN in the 5G AN. The UPF can transmit and/or receive user data and/or control information to and/or from the base station apparatus (gNB), the SMF, and/or the DN in the 5G AN by using the network connection unit_B 720.

As illustrated in FIG. 2, the UPF in the 5GC can communicate with the gNB via the N3 interface, communicate with the SMF via the N4 interface, communicate with the DN via an N6 interface, and communicate with other UPFs via an N9 interface by using the network connection unit_B 720.

The storage medium_B 740 is a functional unit storing programs, user data, control information, and the like that are necessary for operations of the UPF.

The UPF has a function as an anchor point for intra-Radio Access Technology (intra-RAT) mobility or inter-RAT mobility, a function as an external PDU session point for mutual connection to the DN (specifically a function of transferring user data as a gateway between the DN and the core network_B), a function of routing and transferring a packet, an uplink (UL) classifier (CL) function for supporting the routing of a plurality of traffic flows to one DN, a branching point function for supporting a multi-homed PDU session, a quality of service (QoS) processing function for a user plane, an uplink traffic verification function, a function of triggering downlink packet buffering and downlink data notification, and the like.

The UPF may be a gateway for IP communication and/or non-IP communication. The UPF may have a function of transferring IP communication or may have a function of performing conversion between non-IP communication and IP communication. The plurality of gateways deployed may be gateways for connecting the core network_B and a single DN to each other. The UPF may have connectivity with other NFs or may be connected to the apparatuses via the other NFs.

The UE may perform transmitting and/or receiving user data between the UE and a network. The user plane may perform transmitting and/or receiving using a PDN connection or a PDU session. In the case of the EPS, the user plane may perform transmitting and/or receiving using an LTE-Uu interface, an S1-U interface, an S5 interface, an S8 interface, and/or an SGi interface. Further, in the case of the 5GS, a user plane may perform transmitting and/or receiving via an interface between the UE and an NG RAN, the N3 interface, the N9 interface, and/or the N6 interface. Hereinafter, a user plane may be expressed as a U-Plane.

The control plane may perform transmitting and/or receiving a control message in order to perform communication control and the like of the UE. The control plane may perform transmitting and/or receiving by using non-access-stratum (NAS) signaling connection between the UE and the MME. Further, in the case of the EPS, a control plane may perform transmitting and/or receiving by using the LTE-Uu interface and an S1-MME interface. Further, in the case of the 5GS, a control plane may perform transmitting and/or receiving by using an interface between the UE and the NG RAN and the N2 interface. Hereinafter, a control plane may be expressed as a control plane or may be expressed as a C-Plane.

The U-Plane (user plane; UP) may be a communication path for transmitting and/or receiving user data, and may include a plurality of bearers. The C-Plane (CP) may be a communication path for transmitting and/or receiving a control message, and may include a plurality of bearers.

2.6. Description of Other Devices and/or Functions

Next, other apparatuses and/or functions will be disclosed.

The PCF has a function of providing a policy rule, and the like.

The UDM includes an authentication credential processing function, a user identification processing function, an access authentication function, a registration/mobility management function, a subscription management function, and the like.

The PCRF is connected to the PGW and/or the PDN and has a function of performing QoS management for data distribution, and the like. For example, QoS management for a communication path between the UE_A 10 and the PDN is performed. The PCRF may be an apparatus that creates and/or manages a policy and charging control (PCC) rule and/or a routing rule used by each apparatus for transmitting and/or receiving user data.

The HSS is connected to the MME and/or the SCEF, and has a function of managing subscriber information, and the like. The subscriber information of the HSS is referred to, for example, in a case that access control for the MME is performed. The HSS may be connected to a position management apparatus different from the MME.

The SCEF is connected to the DN and/or the PDN, the MME, and the HSS and has a function as a relay apparatus that transfers user data as a gateway for connecting the DN and/or the PDN to the core network_A. The SCEF may be a gateway for non-IP communication. The SCEF may have a function of performing conversion between non-IP communication and IP communication. A plurality of gateways may be deployed in the core network_A. The SCEF may be outside or inside the core network.

3. Description of Terms, Identification Information, and Procedure Used in Implementations Terms, identification information, and procedures to be used will be disclosed as follows.

3.1. Description of Terms and Identification Information Used in Implementations First, highly specialized terms and identification information used in a procedure, which are used in the implementations, will be defined.

A network refers to at least some of the access network_B, the core network_B, and the DN. In addition, one or more apparatuses included in at least some of the access network_B, the core network_B, and the DN may be referred to as a network or a network apparatus. The execution of transmission and/or reception of a message and/or processing by a network may mean that the transmission and/or reception of the message and/or the processing is executed by an apparatus (a network apparatus and/or a control apparatus) in the network. In contrast, the execution of transmission and/or reception of a message and/or processing by an apparatus in a network may mean that the transmission and/or reception of the message and/or the processing is executed by the network.

A session management (SM) message (also referred to as a non-access-stratum (NAS) SM message) may be a NAS message used in a procedure for the SM, or may be a control message transmitted and/or received between the UE_A 10 and the SMF_A 140 through the AMF_A 132. The SM message may include a PDU session establishment request message, a PDU session establishment accept message, a PDU session completion message, a PDU session reject message, a PDU session modification request message, a PDU session modification accept message, a PDU session modification response message, and the like. The procedure for SM may include a PDU session establishment procedure.

The 5GS service may be a connection service provided using the core network_B 190. The 5GS service may be a service different from the EPS service or may be the same service as the EPS service.

The non-5GS service may be a service other than the 5GS service. The non 5GS service may include an EPS service and/or a non-EPS service.

The single registration mode is a mode in which the UE_A 10 maintains a common registration state for the 5GMM state and the EMM state in a case where an N1 mode and an S1 mode can be used.

A dual registration mode is a mode in which the UE_A 10 independently maintains a registration state between the 5GMM state and the EMM state in a case where the N1 mode and the S1 mode can be used. In the case of the dual registration mode, the UE_A 10 may be registered in a network in only the N1 mode (specifically registered in only the 5GC), may be registered in a network only in the S1 mode (registered in only the EPC), or may be registered in a network in both the N1 mode and the S1 mode (registered in both the 5GC and the EPC).

The UE that supports both the 5GC and the EPC NAS can be operated in a single registration mode or a dual registration mode in order to perform interworking between the 5GS and the EPC.

The S1 mode is a mode in which access to the EPC via the E-UTRAN is permitted for the UE_A 10. The S1 mode may be a mode in which the transmission and/or reception of a message using the S1 interface is executed. The S1 interface may include an S1-MME interface and an S1-U interface.

The N1 mode is a mode in which access to the 5GC via the 5G access network is permitted for the UE_A 10. The N1 mode may be a mode in which the transmission and/or reception of a message using the N1 interface is executed.

An access point name (APN) may be identification information for identifying a core network and/or an external network such as a PDN. The APN can also be used as information for selecting a gateway such as a PGW_U 30/a UPF 130 for connecting the core network A_90.

A traffic flow template (TFT) indicates all packet filters associated with an EPS bearer. The TFT is information for identifying a portion of user data to be transmitted and/or received, and the UE_A 10 transmits and/or receives the user data identified by the TFT by using the EPS bearer associated with the TFT. In other words, further, the UE_A 10 transmits and/or receives the user data identified by the TFT using a radio bearer (RB) associated with the TFT. The TFT may be configured such that user data such as application data to be transmitted and/or received is associated with an appropriate transfer path, or may be identification information for identifying the application data. The UE_A 10 may transmit and/or receive user data which cannot be identified by the TFT by using a default bearer. The UE_A 10 may have had the TFT associated with the default bearer stored therein in advance.

A packet data network (PDN) type indicates the type of PDN connection and includes IPv4 (Internet Protocol version 4), IPv6, IPv4v6, and non-IP. A case where IPv4 is designated indicates that data is transmitted and/or received using IPv4. A case where IPv6 is designated indicates that data is transmitted and/or received using IPv6. A case where IPv4v6 is designated indicates that data is transmitted and/or received using IPv4 or IPv6. A case where non-IP is designated indicates that communication is performed using any of other communication methods instead of using an IP.

The EPS bearer is a logical communication path established between the UE and the PGW and is a communication path that includes a PDN connection. The EPS bearer includes a default bearer (also referred to as a default EPS bearer) and a dedicated bearer (also referred to as a dedicated EPS bearer).

The default bearer is an EPS bearer which is first established during the PDN connection, and only one default bearer can be established during one PDN connection. The default bearer may be an EPS bearer that can be used for communication of user data which is not associated with the traffic flow template (TFT).

The dedicated bearer is an EPS bearer established after the default bearer is established during the PDN connection, and one or more dedicated bearers can be established during one PDN connection. The dedicated bearer is an EPS bearer that can be used for communication of user data which is associated with the TFT.

The protocol data unit/packet data unit (PDU) session can be defined as an association between the DN and the UE providing a PDU connectivity service, but may be a connectivity established between the UE and an external gateway. The UE may transmit and receive user data with the DN using the PDU session which is established via the access network_B and the core network_B in the 5GS. The external gateway may be the UPF, the SCEF, or the like. The UE can transmit and/or receive user data to and/or from an apparatus such as an application server deployed in the DN by using the PDU session.

The apparatuses (the UE, the access network apparatus, and/or the core network apparatus) may perform management by associating one or more pieces of identification information with a PDU session. These pieces of identification information may include one or more of data network name (DNN), TFT, and PDU session types, application identification information, NSI identification information, access network identification information, and an SSC mode, or may further include other information. In a case where a plurality of PDU sessions are established, the pieces of identification information associated with the PDU session may have the same contents or may have different contents.

The DNN may be identification information for identifying an external network such as the core network and/or the DN. The DNN can also be used as information for selecting a gateway such as the PGW_U 30 or the UPF 130 connecting the core network_B 190. The DNN may be equivalent to an access point name (APN).

The protocol data unit/packet data unit (PDU) session type indicates the type of PDU session, and includes IPv4, IPv6, Ethernet, and Unstructured. A case where IPv4 is designated indicates that data is transmitted and received using IPv4. A case where IPv6 is designated indicates that data is transmitted and received using IPv6. A case where Ethernet is designated indicates that an Ethernet frame is transmitted and/or received. Ethernet may indicate that communication using IP is not performed. A case where Unstructured is designated indicates that data is transmitted and/or received to an application server or the like in the DN by using a point-to-point (P2P) tunneling technique. As the P2P tunneling technique, for example, a User Datagram Protocol (UDP)/IP encapsulation may be used. The PDU session type may include an IP in addition to the previously-disclosed types. The IP can be designated in a case where the UE is capable of using both IPv4 and IPv6.

The network slice (NS) is a logical network that provides specific network capabilities and network characteristics. The UE and/or a network can support the network slice (NW slice; NS) in the 5GS.

The network slice instance (NSI) includes an instance (entity) of a network function (NF) and a set of necessary resources, and forms a deployed network slice. The NF is a processing function in a network and is adopted or defined in the 3GPP. The NSI is an entity of one or more NSs configured in the core network_B. The NSI may include a virtual network function (NF) generated using a network slice template (NST). The NST is associated with a resource request for providing a required communication service or capability, and is a logical expression of one or more NFs. The NSI may be an aggregation constituted by a plurality of NFs in the core network_B 190. The NSI may be a logical network configured to classify user data distributed via a service or the like. The NS may include one or more NFs. The NF included in the NS may be or may not be an apparatus shared by other NSs. The UE and/or the apparatus in the network can be allocated to one or more NSs based on registration information such as network slice selection assistance information (NSSAI), single network slice selection assistance information (S-NSSAI), a UE usage type, and/or one or more NSI IDs, and/or an APN. The UE usage type is a parameter value which is included in the registration information of the UE and used to identify the NSI. The UE usage type may be stored in the HSS. The AMF may select the SMF and UPF based on the UE usage type.

Single network slice selection assistance information (S-NSSAI) is information for identifying the NS. The S-NSSAI may include by only a slice/service type (SST), or may include by both an SST and a slice differentiator (SD). The SST is information indicating the operation of the NS which is expected in terms of a function and a service. Additionally, the SD may be information for interpolating the SST in a case that one NSI is selected from a plurality of NSIs indicated by the SST. The S-NSSAI may be specific information for each PLMN or may be standard information which is common to the PLMNs. The network may store one or more S-NSSAIs in the registration information of the UE as a default S-NSSAI. In a case where the S-NSSAI is a default S-NSSAI, the network may provide an NS related to the UE in a case that the UE does not transmit a valid S-NSSAI to the network in a registration request message.

The network slice selection assistance information (NSSAI) is a group of S-NSSAIs. The S-NSSAIs included in the NSSAI are information that assists an access network or a core network to select an NSI. The UE may store NSSAI permitted from the network for each PLMN. The NSSAI may be information used to select an AMF.

A session and service continuity (SSC) mode indicates the mode of a session and service continuity supported by a system and/or each apparatus in a 5G system (5GS). The SSC mode may be a mode indicating the type of session and service continuity supported by a PDU session established between the UE_A 10 and the UPF. The SSC mode may be a mode indicating the type of session and service continuity which is configured for each PDU session. The SSC modes may include three modes of an SSC mode 1, an SSC mode 2, and an SSC mode 3. The SSC mode associated with the PDU session may not be changed during the PDU session.

The SSC mode 1 is a mode in which the network maintains a connectivity service to be provided to the UE_A 10. In a case where the PDU session type associated with the PDU session is IPv4 or IPv6, an IP address may be maintained during a session and service continuity.

The SSC mode 1 may be a mode of a session and service continuity in which the same UPF is continuously maintained regardless of an access technology used in a case that the UE_A 10 is connected to a network. The SSC mode 1 may be a mode for implementing a session and service continuity without changing the UPF used as a PDU session anchor of an established PDU session even in a case that movement of the UE_A 10 occurs.

The SSC mode 2 is a mode in which a network releases a connectivity service provided to the UE_A 10 and the corresponding PDU session. In a case where the PDU session type associated with the PDU session is IPv4 or IPv6, an IP address allocated to the UE_A 10 may be released during a session and service continuity.

The SSC mode 2 may be a mode of a session and service continuity in which the same UPF is continuously maintained only in a serving area of the UPF. The SSC mode 2 may be a mode for implementing a session and service continuity without changing a UPF used by an established PDU session as long as the UE_A 10 is in the serving area of the UPF. The SSC mode 2 may be a mode for implementing a session and service continuity by changing the UPF used by the established PDU session in a case where movement in which the UE_A 10 leaves the serving area of the UPF occurs.

The serving area of the UPF may be an area in which one UPF can provide a session and service continuity function, or may be a subset of the access network such as a RAT or a cell used in a case that the UE_A 10 is connected to a network. The subset of the access network may be a network constituted by one or a plurality of RATs and/or cells.

The SSC mode 3 is a mode in which a change in a user plane is revealed to the UE_A 10 while a network ensures that connectivity is not lost. In the case of the SSC mode 3, in order to implement a better connectivity service, connection via a new PDU session anchor point may be established before the previous connection is disconnected. In a case where the PDU session type associated with the PDU session is IPv4 or IPv6, an IP address may not be maintained during a session and service continuity of the transfer of a PDU session anchor.

The SSC mode 3 may be a mode of a session and service continuity that permits the establishment of a new PDU session via a new UPF and/or a communication path for the same DN before a PDU session and/or a communication path established between the UE_A 10 and the UPF is disconnected. The SSC mode 3 may be a mode of a session and service continuity that permits the UE_A 10 to be multi-homing. The SSC mode 3 may be a mode in which a session and service continuity using a plurality of PDU sessions and/or UPFs associated with the PDU sessions is permitted. In the case of the SSC mode 3, each of the apparatuses may implement the session and service continuity using a plurality of PDU sessions or may implement the session and service continuity using a plurality of UPFs.

In a case where each of the apparatuses establishes a new PDU session and/or a communication path, a new UPF may be selected by a network, or the new UPF may be a UPF which is the most suitable UPF where the UE_A 10 is connected to the network. In a case where the plurality of PDU sessions and/or the UPFs used by the PDU sessions are effective, the UE_A 10 may immediately perform association of an application and/or a flow communication with a newly established PDU session or may perform the association based on the completion of communication.

A default SSC mode is an SSC mode used by the UE_A 10 and/or a network in a case where a specific SSC mode is not determined. Specifically, the default SSC mode may be an SSC mode used by the UE_A 10 in a case where there is no request for an SSC mode which is given from the application, and/or a case where there is no policy of the UE_A 10 for determining an SSC mode for the application. The default SSC mode may be an SSC mode used by the network in a case where there is no request for an SSC mode which is given from the UE_A 10.

The default SSC mode may be set per PDN_A 5 based on subscriber information and/or operator policy and/or policy of UE_A 10, or may be set per UE_A 10 and/or subscriber. The default SSC mode may indicate the SSC mode 1, the SSC mode 2, or the SSC mode 3.

In addition, CIoT 5GS optimization is a function for cellular IoT (CIoT) for supporting efficient communication of small data or SMS. The CIoT 5GS optimization may be a function provided in a 5GS which is a 5G system. The CIoT 5GS optimization may include control plane CIoT 5GS optimization, user plane CIoT 5GS optimization, and header compression for control plane CIoT 5GS optimization. The CIoT 5GS optimization may include a 5GMM-CONNECTED mode with RRC inactive indication.

The support of the CIoT 5GS optimization may mean that one or more of the control plane CIoT 5GS optimization, the user plane CIoT 5GS optimization, the header compression for control plane CIoT 5GS optimization, and the 5GMM-CONNECTED mode with RRC inactive indication are supported. The use of the CIoT 5GS optimization may mean that one or more of the control plane CIoT 5GS optimization, the user plane CIoT 5GS optimization, the header compression for control plane CIoT 5GS optimization, and the 5GMM-CONNECTED mode with RRC inactive indication are used. The support of the CIoT 5GS optimization may mean that enhanced coverage and/or restriction on use of the enhanced coverage is supported. The use of the CIoT 5GS optimization may mean that enhanced coverage is used or may mean that the use of the enhanced coverage is restricted.

CIoT EPS optimization in the EPS and CIoT 5GS optimization in the 5GS may support the same function or may support different functions. Further, the CIoT 5GS optimization in the 5GS may include a function provided by the 5GMM-CONNECTED mode with RRC inactive indication.

The CIoT EPS optimization in the EPS and the CIoT 5GS optimization in the 5GS may provide the same function. The disclosed CIoT EPS optimization and CIoT 5GS optimization may be replaced and provided as the same name. The same name may be CIoT optimization, may be CIoT EPS optimization, or may be CIoT 5GS optimization.

The control plane CIoT 5GS optimization is a function for signaling optimization for enabling efficient communication of user data via a control plane of an MME or an AMF. The control plane CIoT 5GS optimization may be a function provided in a 5GS which is a 5G system. In the control plane CIoT 5GS optimization, a header compression function can also be used in a case where communication of IP data is performed and the UE and the network may transmit and/or receive information indicating the support of header compression for control plane CIoT 5GS optimization together with information indicating the support of the control plane CIoT 5GS optimization. In a case where the UE is connected to a RAT for IoT, the control plane CIoT 5GS optimization may be an essential function.

The support of the control plane CIoT 5GS optimization may mean that communication of user data via a control plane is supported, or may mean that the transmission and/or reception of user data which does not require the establishment of a user plane radio bearer for transmitting and/or receiving user data is supported. The use of the control plane CIoT 5GS optimization may mean that communication of user data via a control plane is performed, or may mean that user data is transmitted and/or received without establishing a user plane radio bearer.

The control plane CIoT EPS optimization in the EPS and the control plane CIoT 5GS optimization in the 5GS may be the same function or may be different functions.

The control plane CIoT EPS optimization in the EPS and the control plane CIoT 5GS optimization in the 5GS may be provided as the same function. The control plane CIoT EPS optimization and the control plane CIoT 5GS optimization disclosed in the implementations may be reread and provided as the same name. The same name may be control plane CIoT optimization, may be control plane CIoT EPS optimization, or may be control plane CIoT 5GS optimization.

The user plane CIoT 5GS optimization is a function for signaling optimization that enables efficient communication of user data on a user plane. The user plane CIoT 5GS optimization may be a function provided in a 5GS which is a 5G system.

The support of the user plane CIoT 5GS optimization means that data communication using a user plane radio bearer for transmitting and/or receiving user data and the N3 interface is supported, and suspending and resuming of non-access stratum (NAS) signaling are supported. The support of the user plane CIoT 5GS optimization may mean that transition from an idle mode to a connected mode, which does not require a service request procedure, is supported. The use of the user plane CIoT 5GS optimization may mean that suspending and resuming of NAS signaling are performed, or may mean that transition from an idle mode to a connected mode, which does not require a service request procedure, is performed.

The user plane CIoT EPS optimization in the EPS and the user plane CIoT 5GS optimization in the 5GS may be the same function or may be different functions. The user plane CIoT 5GS optimization in the 5GS may be a function which is the same as or different from a function provided by the 5GMM-CONNECTED mode with RRC inactive indication.

The user plane CIoT EPS optimization in the EPS and the user plane CIoT 5GS optimization in the 5GS may be provided as the same function. The disclosed user plane CIoT EPS optimization and the disclosed user plane CIoT 5GS optimization may be replaced and provided as the same name. The same name may be user plane CIoT optimization, may be user plane CIoT EPS optimization, or may be user plane CIoT 5GS optimization.

The header compression for control plane CIoT 5GS optimization refers to a header compression function. The header compression function may be a function for compressing the size of the header of an IP protocol. The header compression for control plane CIoT 5GS optimization may be a function provided in a 5GS which is a 5G system. The header compression function may be implemented by a framework such as robust header compression (ROHC). Further, configuration information of the header compression function may be configured by a PDU session establishment procedure or may be reset by a PDU session modification procedure.

The header compression for control plane CIoT 5GS optimization may be a function supported in a case where the control plane CIoT 5GS optimization is supported. The header compression for control plane CIoT 5GS optimization may be a function that can be used in a case where the PDU session type of the PDU session associated with the control plane CIoT 5GS optimization is IPv4, IPv6, or IP.

The support of the header compression for control plane CIoT 5GS optimization may mean that communication of user data using the header compression function is supported. The use of the header compression for control plane CIoT 5GS optimization may mean that communication of user data using the header compression function is performed.

The header compression for control plane CIoT EPS optimization in the EPS and the header compression for control plane CIoT 5GS optimization in the 5GS may be the same function or may be different functions.

The header compression for control plane CIoT EPS optimization in the EPS and the header compression for control plane CIoT 5GS optimization in the 5GS may provide the same function. The disclosed header compression for control plane CIoT EPS optimization and the disclosed header compression for control plane CIoT 5GS optimization may be replaced and provided as the same name. The same name may be header compression for control plane CIoT optimization, may be header compression for control plane CIoT EPS optimization, or may be header compression for control plane CIoT 5GS optimization.

The 5GMM-CONNECTED mode with RRC inactive indication is a state indicating that the state of a NAS layer is a connected state, regardless of an RRC layer being in an inactive state. The 5GMM-CONNECTED mode with RRC inactive indication is a state where a radio bearer is released while maintaining NAS signaling connection and/or context of the NAS signaling connection.

The support of the 5GMM-CONNECTED mode with RRC inactive indication may mean that the state of the NAS layer is supported to be maintained in a connected state even in a case that a notification indicating that the RRC layer is set to be in an inactive state has been received from a lower layer. The use of the 5GMM-CONNECTED mode with RRC inactive indication may mean that the state of the NAS layer is maintained in a connected state even in a case that a notification indicating that the RRC layer is set to be in an inactive state has been received from a lower layer.

The support of the 5GMM-CONNECTED mode with RRC inactive indication may mean that user plane CIoT 5GS optimization is supported. The use of the 5GMM-CONNECTED mode with RRC inactive indication may mean that user plane CIoT 5GS optimization is used.

Enhanced coverage is a function of enlarging a coverage area provided by a radio base station. In a case where enhanced coverage is used, a UE can perform communication with a network in a wider area than in the related art. In contrast, in a case where the use of enhanced coverage is restricted, a UE cannot perform enhanced coverage and can perform communication with a network in the same area as in the related art. The enhanced coverage may include a mode A and a mode B.

A tracking area in the present disclosure is one or a plurality of ranges that are managed by a core network and can be expressed by positional information of the UE_A 10. The tracking area may include a plurality of cells. The tracking area may be a range in which a control message such as paging is broadcast, or may be a range in which the UE_A 10 is movable without performing a handover procedure. The tracking area may be a routing area, a location area, or anything similar to these areas. Hereinafter, the tracking area may be a tracking area (TA).

A TA list in the present disclosure is a list including one or a plurality of TAs allocated to the UE_A 10 by a network. The UE_A 10 may be able to move without performing a tracking area update procedure while the UE_A 10 is moving within one or the plurality of TAs included in the TA list. The TA list for the UE_A 10 may be an information group indicating an area in which the UE_A 10 can move without performing the tracking area update procedure. The TA list may be expressed as a tracking area identities (TAI) list constituted by one or a plurality of TAI, and the TAI list may refer to the TA list disclosed subsequently.

An LADN is a DN in which a UE can be connected only in a specific case. The LADN provides connectivity to a specific DNN (specifically an LADN DNN).

LADN information is information related to the LADN. The LADN information may indicate a specific LADN that can be used by a UE. The LADN information may include the LADN DNN and LADN service area information. The LADN DNN may indicate an LADN, may indicate a DN treated as an LADN, or may indicate a DNN used in a case of establishing a PDU session for the LADN. The LADN service area information may indicate an LADN service area. The LADN service area information may be provided as a set of tracking areas or may be provided as a tracking area identity (TAI) list. The LADN service area may be an area in which a PDU session can be established for an LADN, or may be an area in which connection to the LADN can be performed.

The PDU session for the LADN is a PDU session associated with a DNN associated with the LADN. The PDU session for the LADN may be a PDU session established for the LADN. The PDU session may be a PDU session established between the UE and the LADN, or a PDU session used for user data communication between the UE and the LADN. The PDU session for the LADN may be a PDU session that can be established in only the LADN service area.

Narrowband IoT (NB-IoT) is band-limited radio access technology (RAT). The NB-IoT may be a RAT for providing a communication service to an IoT terminal, or may be a RAT in which some of the functions are limited. The NB-IoT may be a RAT constituting an E-UTRAN. The RAT constituting an E-UTRAN other than the NB-IoT may be a WB-E-UTRAN. A mode of a UE connected to a core network and/or a DN using the NB-IoT may be expressed as a NB-N1 mode. In contrast, a mode of a UE connected to a core network and/or a DN using a RAT other than NB-IoT may be expressed as a WB-N1 mode.

First identification information is information indicating a request for CIoT 5GS optimization of a UE. The first identification information may be a PNB-CIoT bit (Preferred CIoT network behavior). The PNB-CIoT bit may indicate control plane CIoT 5GS optimization, or may indicate a request for control plane CIoT 5GS optimization. The PNB-CIoT bit may indicate user plane CIoT 5GS optimization, or may indicate a request for user plane CIoT 5GS optimization. The PNB-CIoT bit may constitute an additional update type information element.

The first identification information may be information selected and determined based on the configuration of the UE, the state of the UE, a user policy, and/or a request for an application.

Second identification information is information indicating whether or not the UE supports control plane CIoT 5GS optimization. The second identification information may be a CP CIoT bit (control plane CIoT 5GS optimization). The CP CIoT bit may indicate that control plane CIoT 5GS optimization is supported (control plane CIoT 5GS optimization supported). The CP CIoT bit may indicate UE capability in 5G and include a 5GMM capability information element.

The second identification information may be information selected and determined based on the configuration of the UE, the state of the UE, a user policy, and/or a request for an application.

Third identification information is information indicating whether or not the UE supports user plane CIoT 5GS optimization. The third identification information may be an UP CIoT bit (user plane CIoT 5GS optimization). The UP CIoT bit may indicate that user plane CIoT 5GS optimization is supported (user plane CIoT 5GS optimization supported). The UP CIoT bit may indicate UE capability in 5G and include a 5GMM capability information element.

The third identification information may be information selected and determined based on the configuration of the UE, the state of the UE, a user policy, and/or a request for an application.

Fourth identification information is information indicating whether or not the UE supports data communication using a communication path of a user plane. The fourth identification information may indicate that the UE supports data communication using the N3 interface which is an interface between the gNB and the UPF. The fourth identification information may be an N3 data bit (N3 data transfer). The N3 data bit may indicate that data communication using the N3 interface is supported (N3 data transfer supported). The N3 data bit may indicate UE capability in 5G and include a 5GMM capability information element.

The fourth identification information may be information selected and determined based on the configuration of the UE, the state of the UE, a user policy, and/or a request for an application.

Fifth identification information is information indicating whether or not the UE supports header compression for control plane CIoT 5GS optimization. The fifth identification information may be a HC-CP CIoT bit (Header compression for control plane CIoT 5GS optimization). The HC-CP CIoT bit may indicate that header compression for control plane CIoT 5GS optimization is supported (Header compression for control plane CIoT 5GS optimization supported). The HC-CP CIoT bit may indicate UE capability in 5G and include a 5GMM capability information element.

The fifth identification information may be information selected and determined based on the configuration of the UE, the state of the UE, a user policy, and/or a request for an application.

Sixth identification information is information indicating whether or not the UE supports restriction on use of enhanced coverage. The sixth identification information may indicate whether or not the UE supports the use of enhanced coverage. The sixth identification information may be a RestrictEC bit (Restriction on use of enhanced coverage support). The RestrictEC bit may indicate that restriction on use of enhanced coverage is supported (Restriction on use of enhanced coverage supported). The RestrictEC bit may indicate UE capability in 5G and include a 5GMM capability information element.

The sixth identification information may be information selected and determined based on the configuration of the UE, the state of the UE, a user policy, and/or a request for an application.

Seventh identification information is information indicating whether or not the UE supports a 5GMM-CONNECTED mode with RRC inactive indication. The seventh identification information may be capability information indicating that the UE can transition between the 5GMM-CONNECTED mode with RRC inactive indication and a 5GMM-CONNECTED mode based on a notification received from a lower layer.

The seventh identification information may be identification information indicating the same meaning as the third identification information. In a case where the third identification information and the seventh identification information indicate the same meaning, only one of the third identification information and the seventh identification information may be transmitted and/or received.

The seventh identification information may be information selected and determined based on the configuration of the UE, the state of the UE, a user policy, and/or a request for an application.

Eighth identification information is a NSSAI requested by the UE. The eighth identification information may be information including one or a plurality of S-NSSAIs. The eighth identification information may include one or a plurality of S-NSSAIs associated with an NSI supporting one or more functions among the functions indicated by the first to seventh identification information.

The eighth identification information may include information related to the association between the S-NSSAIs and the functions indicated by the first to seventh identification information. The eighth identification information may include information indicating which function among the functions indicated by the first to seventh identification information is supported by each of the NSIs.

The eighth identification information may be information selected and determined based on the configuration of the UE, the state of the UE, a user policy, and/or a request for an application.

Ninth identification information is information indicating whether or not the UE supports a multiple user plane radio bearer. The ninth identification information may be a multipleDRB bit (Multiple DRB support). The multipleDRB bit may indicate that a multiple user plane radio bearer is supported (Multiple DRB not supported). The multiple DRB bit may indicate UE capability in 5G and include a 5GMM capability information element.

The ninth identification information may indicate whether or not the UE supports QoS processing in currently connected radio access technology (RAT). The ninth identification information may indicate whether or not the UE supports the establishment of the user plane radio bearers in a case that the UE is using control plane CIoT 5GS optimization in the currently connected RAT. The currently connected RAT may be NB-IoT or may be a RAT other than NB-IoT.

The ninth identification information may be information selected and determined based on the configuration of the UE, the state of the UE, a user policy, and/or a request for an application.

Tenth identification information is information indicating whether or not the UE supports the establishment of a dedicated bearer. The tenth identification information may indicate that the establishment of a dedicated bearer is supported. The tenth identification information may indicate UE capability in 5G and include the 5GMM capability information element.

The tenth identification information may indicate whether or not the UE supports the establishment of a plurality of DRBs and/or a dedicated bearer in a currently connected RAT, or may indicate whether or not the UE supports QoS processing. The currently connected RAT may be NB-IoT or may be a RAT other than NB-IoT.

The tenth identification information may be information selected and determined based on the configuration of the UE, the state of the UE, a user policy, and/or a request for an application.

21st identification information is information indicating that a request for CIoT 5GS optimization of the UE has been accepted. The 21st identification information may be an ANB-CIoT bit (Accepted CIoT network behavior). The ANB-CIoT bit may indicate control plane CIoT 5GS optimization, or may indicate a request for control plane CIoT 5GS optimization. The ANB-CIoT bit may indicate user plane CIoT 5GS optimization, or may indicate a request for user plane CIoT 5GS optimization. The ANB-CIoT bit may constitute an additional update result information element.

The 21st identification information may be information selected and determined via the network, based on one or more pieces of identification information among the received first to third identification information, information associated with NSIs, capability information of the network, an operator policy, the state of the network, registration information of a user, and/or the like.

22nd identification information is information indicating whether or not the network supports control plane CIoT 5GS optimization. The 22nd identification information may be a CP CIoT bit (Control plane CIoT 5GS optimization). The CP CIoT bit may indicate that control plane CIoT 5GS optimization is supported (Control plane CIoT 5GS optimization supported). The CP CIoT bit may constitute a 5GS network feature support information element. The CP CIoT bit may indicate the network capability in 5G and include a 5GMM network feature support information element. The 22nd identification information may indicate that the network has accepted the use of control plane CIoT 5GS optimization.

The 22nd identification information may be information selected and determined via the network, based on one or more pieces of identification information among the received first to third identification information, information associated with NSIs, capability information of the network, an operator policy, the state of the network, registration information of a user, and/or the like.

23rd identification information is information indicating whether or not the network supports user plane CIoT 5GS optimization. The 23rd identification information may be a UP CIoT bit (User plane CIoT 5GS optimization). The UP CIoT bit may indicate that user plane CIoT 5GS optimization is supported (User plane CIoT 5GS optimization supported). The UP CIoT bit may constitute a 5GS network feature support information element. The UP CIoT bit may constitute a 5GMM network feature support information element indicating the capability of the network in 5G. The 23rd identification information may indicate that the network has accepted the use of user plane CIoT 5GS optimization.

The 23rd identification information may be information selected and determined via the network, based on one or more pieces of identification information among the received first to third identification information, information associated with NSIs, capability information of the network, an operator policy, the state of the network, registration information of a user, and/or the like.

24th identification information is information indicating whether or not the network supports data communication using a communication path of a user plane. The 24th identification information may indicate that the network supports data communication using the N3 interface which is an interface between the gNB and the UPF. The 24th identification information may be an N3 data bit (N3 data transfer). The N3 data bit may indicate that data communication using the N3 interface is supported (N3 data transfer supported). The N3 data bit may constitute a 5GMM network feature support information element indicating the capability of the network in 5G. The 24th identification information may indicate that the network has accepted the data communication using the N3 interface.

The 23rd identification information and/or the 24th identification information may be identification information indicating that a communication path of a user plane is established or may be identification information indicating that the establishment of a communication path of a user plane can be executed in a case that the network is using user data communication using control plane CIoT 5GS optimization.

The 24th identification information may be information selected and determined via the network, based on the received fourth identification information, information associated with NSIs, capability information of the network, an operator policy, the state of the network, registration information of a user, and/or the like 25th identification information is information indicating whether or not the network supports header compression for control plane CIoT 5GS optimization. The 25th identification information may be a HC-CP CIoT bit (Header compression for control plane CIoT 5GS optimization). The HC-CP CIoT bit may indicate that header compression for control plane CIoT 5GS optimization is supported (Header compression for control plane CIoT 5GS optimization supported). The HC-CP CIoT bit may constitute a 5GS network feature support information element. The HC-CP CIoT bit may constitute a 5GMM network feature support information element indicating the capability of the network in 5G. The 25th identification information may indicate that the network has accepted the use of header compression for control plane CIoT 5GS optimization.

The 25th identification information may be information selected and determined via the network, based on the received fifth identification information, information associated with NSIs, capability information of the network, an operator policy, the state of the network, registration information of a user, and/or the like.

26th identification information is information indicating whether or not the network is restricting the use of enhanced coverage. The 26th identification information may indicate whether or not the network is permitted to use enhanced coverage. The 26th identification information may be a RestrictEC bit (Restriction on enhanced coverage). The RestrictEC bit may indicate that the use of enhanced coverage is restricted (Use of enhanced coverage is restricted), or may indicate that the use of enhanced coverage is not restricted (Use of enhanced coverage is not restricted). The RestrictEC bit may constitute a 5GMM network feature support information element indicating the capability of the network in 5G. The 26th identification information may indicate that the network has accepted the use of enhanced coverage.

The 26th identification information may be information selected and determined via the network, based on the received 26th identification information, information associated with NSIs, capability information of the network, an operator policy, the state of the network, registration information of a user, and/or the like.

27th identification information is information indicating whether or not the network supports a 5GMM-CONNECTED mode with RRC inactive indication. The 27th identification information may be capability information indicating that the network can manage the transition of a UE between a 5GMM-CONNECTED mode with RRC inactive indication and a 5GMM-CONNECTED mode based on a notification received from a lower layer. The 27th identification information may indicate that the network has accepted the use of the 5GMM-CONNECTED mode with RRC inactive indication.

The 27th identification information may be identification information indicating the same meaning as the 23rd identification information. In a case where the 23rd identification information and the 27th identification information indicate the same meaning, only one of the 23rd identification information and the 27th identification information may be transmitted and/or received.

The 27th identification information may be information selected and determined via the network, based on the received seventh identification information, information associated with NSIs, capability information of the network, an operator policy, the state of the network, registration information of a user, and/or the like.

28th identification information is NSSAI accepted by the network. The 28 th identification information may be information includes one or a plurality of S-NSSAIs. The 28th identification information may include one or a plurality of S-NSSAIs associated with an NSI supporting one or more functions among the functions indicated by the 22nd to 27th identification information. The 28th identification information may include one or a plurality of S-NSSAIs associated with an NSI for which the use of one or more functions among the functions indicated by the 22nd to 27th identification information has been accepted.

The 28th identification information may include information on association between the S-NSSAIs and the functions indicated by the 22nd to 27th identification information. The 28th identification information may include information indicating which function among the functions indicated by the 22nd to 27th identification information is supported by each of the NSIs, or may include information indicating which function has been accepted to be used for each of the NSIs.

The 28th identification information may be information selected and determined via the network, based on the received eighth identification information, information associated with NSIs, capability information of the network, an operator policy, the state of the network, registration information of a user, and/or the like.

In a case where the UE is an IoT terminal, the number of S-NSSAIs included in the NSSAI indicated by the 28th identification information may be only one. In a case that the UE is an IoT terminal, the 28th identification information may include a single S-NSSAI.

29th identification information is information indicating whether or not the network supports multiple user plane radio bearers. The 29th identification information may be a multipleDRB bit (Multiple DRB support). The multipleDRB bit may indicate that multiple user plane radio bearers are supported (Multiple DRB not supported). The multipleDRB bit may be bits constituting a 5GS network feature support information element. The multipleDRB bit may be bits constituting a 5GMM network feature support information element indicating the capability of the network in 5G. The 29th identification information may indicate that the network has accepted the use of multiple user plane radio bearers.

The 29th identification information may indicate whether or not the network supports QoS processing in a currently connected RAT. The 29th identification information may indicate whether or not the network supports the establishment of the user plane radio bearers in a case that the network is using the control plane CIoT 5GS optimization in the currently connected RAT.

The 29th identification information may indicate that the network has accepted the use of the QoS processing in the currently connected RAT. The 29th identification information may indicate that the network has accepted the establishment of the user plane radio bearers in a case that the network is using the control plane CIoT 5GS optimization in the currently connected RAT. The currently connected RAT may be NB-IoT or may be a RAT other than NB-IoT.

The 29th identification information may be information selected and determined via the network, based on the received ninth identification information, information associated with NSIs, capability information of the network, an operator policy, the state of the network, registration information of a user, and/or the like.

30th identification information is information indicating whether or not the network supports the establishment of a dedicated bearer. The 30th identification information may indicate that the establishment of the dedicated bearer is supported. The 30th identification information may constitute a 5GS network feature support information element. The 30th identification information may constitute the 5GMM network feature support information element indicating the capability of the network in 5G. The 30th identification information may indicate that the network has accepted the use of the dedicated bearer.

The 30th identification information may indicate whether or not the UE supports the establishment of a plurality of DRBs and/or the dedicated bearer in a currently connected RAT, or may indicate whether or not the UE supports QoS processing.

The 30th identification information may indicate that the network has accepted the establishment of the plurality of DRBs and/or the dedicated bearer in the currently connected RAT, or may indicate that the network has accepted the use of the QoS processing. The currently connected RAT may be NB-IoT or may be a RAT other than NB-IoT.

The 30th identification information may be information selected and determined via the network, based on the received tenth identification information, information associated with NSIs, capability information of the network, an operator policy, the state of the network, registration information of a user, and/or the like.

31st identification information is local area data network (LADN) information. The 31st identification information may be LADN information permitted by the network, or may be valid LADN information. The 31st identification information may be transmitted and/or received in a case where there is an LADN service area in a registration area to which the UE is connected.

The 31st identification information may be information selected and determined via the network, based on capability information of the network, an operator policy, the state of the network, registration information of a user, and/or the like.

41st identification information is information indicating that a communication path requested to be established is a communication path in which only control plane CIoT 5GS optimization can be used. The 41st identification information may indicate that the communication path requested to be established is a communication path that cannot be mapped to a communication path of a user plane. The 41st identification information may indicate that the communication path requested to be established is a communication path which is released in a case where the control plane CIoT 5GS optimization cannot be used. The 41st identification information may indicate that the apparatuses cannot map user data communication associated with the communication path requested to be established to a communication path of a user plane. The communication path may be a PDU session.

The 41st identification information may be information selected and determined based on the configuration of the UE, the state of the UE, a user policy, and/or a request for an application.

42nd identification information is S-NSSAI requested by the UE. The 42nd identification information may be S-NSSAI associated with an NSI for which the use of one or more functions among the functions indicated by the 22nd to 27th identification information has been accepted.

The 42nd identification information may be information selected and determined based on the 21st to 28th identification information, the configuration of the UE, the state of the UE, a user policy, and/or a request for an application.

The 43rd identification information is information indicating an SSC mode. The 43rd identification information may indicate an SSC mode requested by the UE_A 10. The 43rd identification information may indicate an SSC mode requested by the UE_A 10 and associated with a PDU session established in the present procedure. The 43rd identification information may indicate an SSC mode 1, may indicate an SSC mode 2, or may indicate an SSC mode 3.

The 43rd identification information may be information selected and determined based on the 21st to 28th identification information, the configuration of the UE, the state of the UE, a user policy, and/or a request for an application.

51st identification information is information indicating that an established communication path is a communication path in which only control plane CIoT 5GS optimization can be used. The 51st identification information may indicate that an established communication path is a communication path that cannot be mapped to a communication path of a user plane. The 51st identification information may indicate that an established communication path is a communication path which is released in a case where the control plane CIoT 5GS optimization cannot be used. The 51st identification information may indicate that the apparatuses cannot map user data communication associated with an established communication path to a communication path of a user plane. The communication path may be a PDU session.

The 51st identification information may be information selected and determined via the network, based on the received 41st identification information, information associated with NSIs, capability information of the network, an operator policy, the state of the network, registration information of a user, and/or the like.

The 52nd identification information is S-NSSAI selected by the network. The 52nd identification information may be S-NSSAI which is associated with an NSI permitted to be used by the network. The 52nd identification information may be S-NSSAI which is associated with an NSI for which the use of one or more functions among the functions indicated by the 22nd to 27th identification information has been accepted.

The 52nd identification information may be information selected and determined via the network, based on the received 42nd identification information, information associated with NSIs, capability information of the network, an operator policy, the state of the network, registration information of a user, and/or the like.

53rd identification information is information indicating an SSC mode. The 53rd identification information may indicate an SSC mode selected by the network. The 53rd identification information may indicate an SSC mode selected by the network and associated with a PDU session established in the present procedure. The selected SSC mode may be an SSC mode 1, may be an SSC mode 2, or may be an SSC mode 3. The selected SSC mode may be an SSC mode which is determined according to units of APNs and/or units of PDN types, or may be a default SSC mode.

The 53rd identification information may be information selected and determined via the network, based on the received 43rd identification information, information associated with NSIs, capability information of the network, an operator policy, the state of the network, registration information of a user, and/or the like.

61st identification information is information of new CIoT 5GS optimization. The 61st identification information may indicate that CIoT 5GS optimization being currently used is required to be changed. The 61st identification information may indicate the changed CIoT 5GS optimization. The 61st identification information may indicate the CIoT 5GS optimization different from the currently used CIoT 5GS optimization. The 61st identification information may indicate the CIoT 5GS optimization which is different from the CIoT 5GS optimization indicated by the 21st identification information transmitted and/or received before. The CIoT 5GS optimization may be control plane CIoT 5GS optimization or may be user plane CIoT 5GS optimization.

The 61st identification information may be information selected and determined via the network, based on one or more pieces of identification information among the first to third identification information and the 21st to 23rd identification information that have already been transmitted and/or received, information associated with NSIs, capability information of the network, an operator policy, the state of the network, registration information of a user, and/or the like. The 61st identification information may be the same information as the 21st identification information.

62nd identification information is new support information of the control plane CIoT 5GS optimization. The 62nd identification information may indicate that the support information of the control plane CIoT 5GS optimization is required to be updated. The 62nd identification information may be the updated support information of the control plane CIoT 5GS optimization. The 62nd identification information may be supporting information of the control plane CIoT 5GS optimization which is different from the current support information of the control plane CIoT 5GS optimization. The 62nd identification information may be support information of the control plane CIoT 5GS optimization which is different from the support information of the control plane CIoT 5GS optimization indicated by the 22nd identification information transmitted and/or received before. The support information of the control plane CIoT 5GS optimization may indicate that the control plane CIoT 5GS optimization is supported, or may indicate that the control plane CIoT 5GS optimization is not supported.

The 62nd identification information may be information selected and determined via the network, based on one or more pieces of identification information among the first to third identification information and the 21st to 23rd identification information which have been transmitted and/or received before, information associated with NSIs, capability information of the network, an operator policy, the state of the network, registration information of a user, and/or the like. The 62nd identification information may be the same information as the 22nd identification information.

63rd identification information is new support information of the user plane CIoT 5GS optimization. The 63rd identification information may indicate that the support information of the user plane CIoT 5GS optimization is required to be updated. The 63rd identification information may be the updated support information of the user plane CIoT 5GS optimization. The 63rd identification information may be support information of the user plane CIoT 5GS optimization which is different from the current support information of the user plane CIoT 5GS optimization. The 63rd identification information may be support information of the user plane CIoT 5GS optimization which is different from the support information of the user plane CIoT 5GS optimization indicated by the 23rd identification information transmitted and/or received before. The support information of the user plane CIoT 5GS optimization may indicate that the user plane CIoT 5GS optimization is supported, and may indicate that the user plane CIoT 5GS optimization is not supported.

The 63rd identification information may be information selected and determined via the network, based on one or more pieces of identification information among the first to third identification information and the 21st to 23rd identification information which have been transmitted and/or received before, information associated with NSIs, capability information of the network, an operator policy, the state of the network, registration information of a user, and/or the like. The 63rd identification information may be the same as the 23rd identification information.

64th identification information is new support information of data communication using a communication path of a user plane. The 64th identification information may indicate that the support information of the data communication using the communication path of the user plane is required to be updated. The 64th identification information may be the updated support information of the data communication using the communication path of the user plane. The 64th identification information may be support information of the data communication using the communication path of the user plane which is different from the current support information of the data communication using the communication path of the user plane. The 64th identification information may be support information of the data communication using the communication path of the user plane which is different from the support information of the data communication using the communication path of the user plane indicated by the 24th identification information transmitted and/or received before. The support information of the data communication using the communication path of the user plane may indicate that the data communication using the communication path of the user plane is supported, or may indicate that the data communication using the communication path of the user plane is not supported.

The 64th identification information may be information selected and determined via the network, based on the fourth identification information and/or the 24th identification information which have been transmitted and/or received before, information associated with NSIs, capability information of the network, an operator policy, the state of the network, registration information of a user, and/or the like. The 64th identification information may be the same as the 24th identification information.

65th identification information is new support information of header compression for control plane CIoT 5GS optimization. The 65th identification information may indicate that the support information of the header compression for control plane CIoT 5GS optimization is required to be updated. The 65th identification information may be the updated support information of the header compression for control plane CIoT 5GS optimization. The 65th identification information may be support information of the header compression for control plane CIoT 5GS optimization which is different from the current support information of the header compression for control plane CIoT 5GS optimization. The 65th identification information may be support information of the header compression for control plane CIoT 5GS optimization which is different from the support information of the header compression for control plane CIoT 5GS optimization indicated by the 25th identification information transmitted and/or received before. The support information of the header compression for control plane CIoT 5GS optimization may indicate that the header compression for control plane CIoT 5GS optimization is supported, or may indicate that the header compression for control plane CIoT 5GS optimization is not supported.

The 65th identification information may be information selected and determined via the network, based on the fifth identification information and/or the 25th identification information which have been transmitted and/or received before, information associated with NSIs, capability information of the network, an operator policy, the state of the network, registration information of a user, and/or the like. The 65th identification information may be the same as the 25th identification information.

66th identification information is new restriction information of an enhanced coverage. The 66th identification information may indicate that the restriction information of the enhanced coverage is required to be updated. The 66th identification information may be the updated restriction information of the enhanced coverage. The 66th identification information may be restriction information of the enhanced coverage which is different from the current restriction information of the enhanced coverage. The 66th identification information may be restriction information of the enhanced coverage which is different from the restriction information of the enhanced coverage which is indicated by the 26th identification information transmitted and/or received before. The restriction information of the enhanced coverage may indicate that the use of the enhanced coverage is restricted, or may indicate that the use of the enhanced coverage is not restricted.

The 66th identification information may indicate that support information of restriction related to the use of an enhanced coverage is required to be updated. The 66th identification information may be the updated support information of the restriction related to the use of then enhanced coverage. The 66th identification information may be support information of restriction related to the use of an enhanced coverage which is different from the current support information of restriction related to the use of an enhanced coverage. The 66th identification information may be support information of restriction related to the use of an enhanced coverage which is different from the support information of restriction related to the use of an enhanced coverage which is indicated by the 16th identification information transmitted and/or received before. The support information of restriction related to the use of an enhanced coverage may indicate that the restriction related to the use of an enhanced coverage is supported, or may indicate that the restriction related to the use of an enhanced coverage is not supported.

The 66th identification information may be information selected and determined via the network, based on the sixth identification information and/or the 26th identification information which have been transmitted and/or received before, information associated with NSIs, capability information of the network, an operator policy, the state of the network, registration information of a user, and/or the like. The 66th identification information may be the same as the 26th identification information.

67th identification information is new support information of a 5GMM-CONNECTED mode with RRC inactive indication. The 67th identification information may indicate that the support information of the 5GMM-CONNECTED mode with RRC inactive indication is required to be updated. The 67th identification information may be the updated support information of the 5GMM-CONNECTED mode with RRC inactive indication. The 67th identification information may be support information of the 5GMM-CONNECTED mode with RRC inactive indication which is different from the current support information of the 5GMM-CONNECTED mode with RRC inactive indication. The 67th identification information may be support information of the 5GMM-CONNECTED mode with RRC inactive indication which is different from the support information of the 5GMM-CONNECTED mode with RRC inactive indication indicated by the 27th identification information transmitted and/or received before. The support information of the 5GMM-CONNECTED mode with RRC inactive indication may indicate that the 5GMM-CONNECTED mode with RRC inactive indication is supported, or may indicate that the 5GMM-CONNECTED mode with RRC inactive indication is not supported.

The 67th identification information may be identification information indicating the same meaning as the 63rd identification information. In a case where the 63rd identification information and the 67th identification information indicate the same meaning, only one of the 63rd identification information and the 67th identification information may be transmitted and/or received.

The 67th identification information may be information selected and determined via the network, based on the seventh identification information and/or the 27th identification information which have been transmitted and/or received before, information associated with NSIs, capability information of the network, an operator policy, the state of the network, registration information of a user, and/or the like. The 67th identification information may be the same as the 27th identification information.

68th identification information is new LADN information. The 68th identification information may indicate that the LADN information is required to be updated. The 68th identification information may be the updated LADN information. The 68th identification information may be LADN information different from the current LADN information. The 68th identification information may be LADN information different from the LADN information indicated by the 31st identification information transmitted and/or received before. The 68th identification information may indicate that an LADN DNN has been updated, or may indicate that an LADN service area has been updated.

The 68th identification information may be information selected and determined via the network, based on the 11th identification information and/or the 31st identification information which have been transmitted and/or received before, information associated with NSIs, capability information of the network, an operator policy, the state of the network, registration information of a user, and/or the like. The 68th identification information may be the same as the 31st identification information.

The 69th identification information is information indicating whether or not the execution of a registration procedure is requested. The 69th identification information may be a Registration requested (RED) bit. The RED bit may indicate that the execution of the registration procedure is requested (registration requested), or may indicate that the execution of the registration procedure is not requested (registration not requested). The RED bit may constitute a configuration update indication. The 69th identification information may indicate that the network needs to execute the registration procedure after the present procedure is completed.

The 69th identification information may be information selected and determined via the network, based on one or more pieces of identification information among the 61st to 68th identification information, information associated with NSIs, capability information of the network, an operator policy, the state of the network, registration information of a user, and/or the like.

In a case of receiving the 69th identification information with at least one identification information from one or more pieces of identification information among the 61st to 68th identification information, the UE may initiate the registration procedure.

3.2. Description of Procedure Used in Implementations

The procedures of the present disclosure include a registration procedure, a PDU session establishment procedure, and a generic UE configuration update procedure.

As illustrated in FIG. 2, an HSS and a UDM, a PCF and a PCRF, an SMF and a PGW-C, and an UPF and a PGW-U are configured as the same apparatus (specifically the same physical hardware, the same logical hardware, or the same software). However, the present disclosure can also be applied to a case where these apparatuses are configured as different apparatuses (specifically different physical hardware, different logical hardware, or different software). For example, data may be transmitted and/or received directly between these apparatuses, data may be transmitted and/or received via the N26 interface between an AMF and an MME, or data may be transmitted and/or received via a UE.

3.2.1. Registration Procedure

Figure 6:
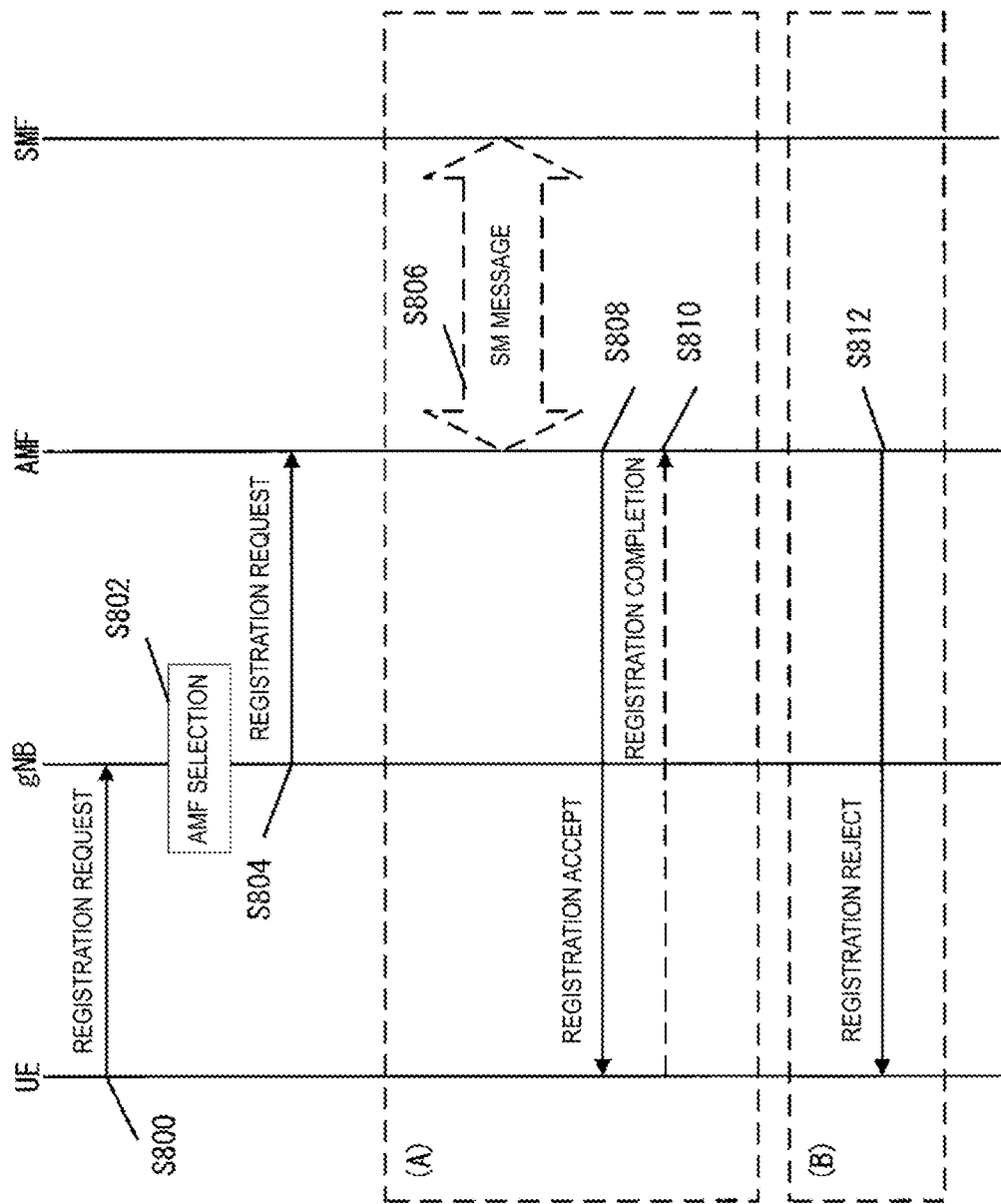
FIG. 6 illustrates a registration procedure according to an implementation of the present disclosure.

A registration procedure will be disclosed with reference to FIG. 6. FIG. 6 illustrates a registration procedure according to an implementation of the present disclosure. The registration procedure is a procedure in a 5GS. The registration procedure is a procedure for registration in the access network_B, the core network_B, and/or the DN initiated by the UE. In a state where the UE is not registered in the network, the UE can execute the present procedure at any time such as in a case that power is supplied. If the UE is in a non-registered state (RM-DEREGISTERED state), the UE may initiate the present procedure at any time. The apparatuses (specifically, the UE and the AMF) can transition to a registered state (RM-REGISTERED state) based on the completion of the registration procedure.

The registration procedure may update position registration information of the UE in the network, regularly giving notice of the state of the UE from the UE to the network, and/or updating specific parameters related to the UE in the network.

The UE may initiate the registration procedure in a case where the UE applies mobility across TAs. The UE may initiate the registration procedure in a case that the UE moves to a TA different from a TA indicated in a TA list that the UE stores. The UE may initiate the present procedure in a case that a tinier expires. The UE may initiate the registration procedure in a case that the context of each apparatus is required to be updated due to disconnection or invalidation of a PDU session. The UE may initiate the registration procedure in a case where a change occurs in capability information and/or preference regarding PDU session establishment of the UE. The UE may initiate the registration procedure on a regular basis. The UE may initiate the registration procedure based on the completion of the UE configuration update procedure. The present disclosure is not limited thereto, and the UE can perform the registration procedure at any time.

First, the UE transmits a registration request message to the AMF via the 5G AN (or the gNB) (S800), (S802), and (S804) to initiate the registration procedure. Specifically, the UE transmits an RRC message including the registration request message to the 5G AN (or the gNB) (S800). The registration request message is a NAS message. The RRC message may be a control message transmitted and/or received between the UE and the 5G AN (or a gNB). The NAS message is processed in a NAS layer, and the RRC message is processed in an RRC layer. The NAS layer is a layer higher than the RRC layer.

The UE can transmit the registration request message and/or the RRC message including one or more pieces of identification information among at least the first to tenth identification information, but may transmit a different control message including the identification information, for example, a control message for a layer lower than the RRC layer (for example, a MAC layer, an RLC layer, or a PDCP layer). The UE may indicate that the UE supports each function or indicate a request of the UE by transmitting these pieces of identification information. Further, two or more pieces of identification information among these pieces of identification information may be configured as one or more pieces of identification information. It is noted that information indicating the support of each function and information indicating a request for the use of each function may be transmitted and/or received as the same identification information or may be transmitted and/or received as different identification information.

The UE may transmit first identification information and/or second identification information to indicate a request for the use of control plane CIoT 5GS optimization. The first identification information may indicate the control plane CIoT 5GS optimization. The second identification information may indicate the support of the control plane CIoT 5GS optimization.

The UE may transmit the first identification information, third identification information, and/or fourth identification information to indicate a request for the use of user plane CIoT 5GS optimization. The first identification information may indicate the user plane CIoT 5GS optimization. The third identification information may indicate the support of the user plane CIoT 5GS optimization. The fourth identification information may indicate the support of data communication using a communication path of a user plane.

The UE may transmit fifth identification information to indicate a request for the use of header compression for control plane CIoT 5GS optimization. The fifth identification information may indicate the support of the header compression for control plane CIoT 5GS optimization.

The UE may transmit sixth identification information to indicate a request for the use of restriction related to the use of an enhanced coverage. The sixth identification information may indicate the support of the restriction related to the use of an enhanced coverage.

The UE may transmit seventh identification information to indicate a request for the use of 5GMM-CONNECTED mode with RRC inactive indication. The seventh identification information may indicate the support of the 5GMM-CONNECTED mode with RRC inactive indication.

The UE may transmit the eighth identification information to request the use of an NSSAI indicated by the eighth identification information and/or the use of an S-NSSAI included in the eighth identification information or indicate the NSSAI requested to be used.

The UE may indicate that the establishment of a plurality of user plane radio bearers and/or the execution of QoS processing is supported in a currently connected RAT by transmitting the ninth identification information and/or the tenth identification information. Further, the UE may transmit the ninth identification information and/or the tenth identification information to request to establish a plurality of user plane radio bearers and/or to transition to a state where QoS processing can be performed. The ninth identification information may indicate that the multiple user plane radio bearers are supported. The tenth identification information may indicate that the establishment of a dedicated bearer is supported. The currently connected RAT may be NB-IoT or may be a RAT other than NB-IoT. The QoS processing may refer to using a plurality of QoS levels for user data communication.

The UE may initiate a PDU session establishment procedure during a registration procedure by transmitting a registration request message including an SM message (for example, a PDU session establishment request message) or transmitting an SM message (for example, a PDU session establishment request message) together with a registration request message.

In a case that the 5G AN (or the gNB) receives an RRC message including a registration request message, the 5G AN (or the gNB) selects an AMF that transfers the registration request message (S802). The 5G AN (or the gNB) can select the AMF based on information included in the registration request message and/or the RRC message. The 5G AN (or the gNB) takes out the registration request message from the received RRC message and transfers the registration request message to the selected AMF (S804).

The AMF can execute a first condition determination in a case of receiving the registration request message. The first condition determination is performed to determine whether or not the network (or the AMF) accepts a request from the UE. The AMF initiates procedure (A) of FIG. 6 in a case where the first condition determination is true, and initiates procedure (B) of FIG. 6 in a case where the first condition determination is false.

The first condition determination may be executed based on the reception of the registration request message, each identification information included in the registration request message, subscriber information, capability information of the network, an operator policy, the state of the network, registration information of a user, context stored in the AMF, and/or the like. For example, the first condition determination may be true in a case where the network permits a request of the UE, and the first condition determination may be false in a case where the network does not permit a request of the UE. The first condition determination may be true in a case where the network, which is a registration destination of the UE and/or the apparatus in the network, supports a function requested by the UE, and the first condition determination may be false in a case where the network does not support the function requested by the UE. The first condition determination may be true in a case where identification information to be transmitted and/or received is permitted, and the first condition determination may be false in a case where identification information to be transmitted and/or received is not permitted. It is noted that conditions for determining whether the first condition determination is true or false may not be limited to the previously-disclosed conditions.

First, a case where the first condition determination is true will be disclosed. The AMF can execute a fourth condition determination in procedure (A) of FIG. 6. The fourth condition determination is performed to determine whether the AMF transmits and/or receives an SM message to and/or from an SMF.

The fourth condition determination may be executed based on whether the AMF has received an SM message. The fourth condition determination may be executed based on whether an SM message is included in a registration request message. For example, the fourth condition determination may be true in a case where the AMF has received the SM message and/or in a case where the SM message is included in the registration request message, and the fourth condition determination may be false in a case where the AMF has not received the SM message and/or in a case where the SM message is not included in the registration request message. It is noted that conditions for determining whether the fourth condition determination is true or false are not limited to the previously-disclosed conditions.

When the fourth condition is determined to be true, the AMF selects an SMF, and transmits and/or receives an SM message to and/or from the selected SMF. When the fourth condition is determined to be false, the AMF does not select the SMF nor perform transmission and reception of the SM message (S806). In a case that the AMF receives an SM message indicating rejection from the SMF even in a case that the fourth condition determination is true, the AMF may stop procedure (A) in FIG. 6. The AMF may initiate procedure (B) of FIG. 6.

The AMF can notify the SMF of identification information received according to the registration request message in a case that the AMF transmits and/or receives the SM message to and/or from the SMF in S806. The SMF may acquire the identification information received from the AMF by transmitting and/or receiving the SM messages to and/or from the AMF.

The AMF transmits a registration accept message to the UE via the 5G AN (or the gNB) as a response message to the registration request message based on the reception of the registration request message and/or the completion of transmission and/or reception of the SM message to and/or from the SMF (S808). For example, in a case where the fourth condition determination is true, the AMF may transmit the registration accept message based on the registration request message received from the UE. In a case where the fourth condition determination is false, the AMF may transmit the registration accept message based on the completion of transmission and/or reception of the SM message to and/or from the SMF. The registration accept message is a NAS message transmitted and/or received on the N1 interface, but is transmitted and/or received in a state of being included in the RRC message between the UE and the 5G AN (gNB).

The AMF may transmit the registration accept message including one or more pieces of identification information among at least the 21st to 31st identification information. The AMF may transmit these pieces of identification information to indicate that the network supports each function and/or indicate that a request of the UE has been accepted. Further, two or more pieces of identification information of these pieces of identification information may be configured as one or more pieces of identification information. It is noted that information indicating the support of each function and information indicating a request for the use of each function may be transmitted and/or received as the same identification information or may be transmitted and/or received as different identification information.

The AMF may transmit the 21st identification information and/or the 22nd identification information to indicate acceptance of use of control plane CIoT 5GS optimization. The 21st identification information may indicate the control plane CIoT 5GS optimization. The 22nd identification information may indicate the support of the control plane CIoT 5GS optimization.

The AMF may transmit the 21st identification information, the 23rd identification information, and/or the 24th identification information to indicate the acceptance of the use of user plane CIoT 5GS optimization. The 21st identification information may indicate the user plane CIoT 5GS optimization. The 23rd identification information may indicate the support of the user plane CIoT 5GS optimization. The 24th identification information may indicate the support of data communication using a communication path of a user plane.

The AMF may transmit the 25th identification information to indicate the acceptance of use of header compression for control plane CIoT 5GS optimization. The 25th identification information may indicate the support of the header compression for control plane CIoT 5GS optimization.

The AMF may transmit the 26th identification information to indicate that the use of an enhanced coverage is restricted. The 26th identification information may indicate that the use of an enhanced coverage is restricted.

The AMF may transmit the 27th identification information to indicate the acceptance of use of 5GMM-CONNECTED mode with RRC inactive indication. The 27th identification information may indicate the support of the 5GMM-CONNECTED mode with RRC inactive indication.

The UE may transmit the 28th identification information to indicate that a request for the use of the NSSAI indicated by the received eighth identification information and/or the S-NSSAI included in the eighth identification information has been accepted, or notify the UE of the NSSAI for which a request for the use has been accepted.

The AMF may transmit the 29th identification information and/or the 30th identification information to indicate that the network supports the establishment of a plurality of user plane radio bearers and/or the execution of QoS processing in the currently connected RAT. The AMF may transmit the 29th identification information and/or the 30th identification information to indicate that a request for establishing a plurality of user plane radio bearers and/or a request for transitioning to a state where QoS processing can be performed has been accepted. The 29th identification information may indicate that multiple user plane radio bearers are supported. The 30th identification information may indicate that the establishment of a dedicated bearer is supported. The currently connected RAT may be NB-IoT or may be a RAT other than NB-IoT.

The AMF may transmit the 31st identification information to indicate that the network supports the LADN or indicate that connection to the LADN is permitted. The AMF may transmit the 31st identification information to notify the UE of a list of DNNs that can be used in the connection to the LADN and/or an area where connection to the LADN is possible.

The AMF may select and determine which identification information among the 21st to 31st identification information is included in the registration accept message, based on the received pieces of identification information, subscriber information, capability information of the network, an operator policy, the state of the network, registration information of a user, context stored in the AMF, and/or the like.

The AMF can transmit the registration accept message including an SM message (for example, a PDU session establishment accept message) or can transmit an SM message (for example, a PDU session establishment accept message) together with the registration accept message. However, this transmission method may be executed in a case where an SM message (for example, a PDU session establishment request message) is included in the registration request message and the fourth condition determination is true. The transmission method may be executed in a case where the registration request message and the SM message (for example, the PDU session establishment request message) are included and the fourth condition determination is true. The AMF can indicate that a procedure for SM has been accepted in the registration procedure by performing such a transmission method.

The AMF may transmit the registration accept message based on the received pieces of identification information, subscriber information, capability information of the network, an operator policy, the state of the network, registration information of a user, context stored in the AMF, and/or the like to indicate that a request of the UE has been accepted.

The AMF may transmit the registration accept message including information indicating that some of the requests of the UE have been rejected, or may transmit information indicating that some of the requests of the UE have been rejected to indicate the reason that some of the requests of the UE have been rejected. The UE may recognize the reason that some of the requests of the UE have been rejected by receiving information indicating that some of the requests of the UE have been rejected. The reason of the rejection may indicate that the content indicated by the identification information received by the AMF is not permitted.

The UE receives the registration accept message via the 5G AN (gNB) (S808). The UE can recognize that a request of the UE via the registration request message has been accepted and recognize contents of various identification information included in the registration accept message by receiving the registration accept message.

The UE can further transmit a registration completion message to the AMF via the 5G AN (gNB) as a response message to the registration accept message (S810). In a case where the UE has received an SM message, such as a PDU session establishment accept message, the UE may transmit a registration completion message including an SM message such as a PDU session establishment completion message, or may indicate that the procedure for SM has been completed by including the SM message in the registration completion message. The registration completion message is a NAS message transmitted and/or received on the N1 interface, but is transmitted and/or received in a state of being included in the RRC message between the UE and the 5G AN (gNB).

The AMF receives the registration completion message via the 5G AN (gNB) (S810). Each of the apparatuses completes procedure (A) in FIG. 6 based on the transmission and/or reception of the registration accept message and/or the registration completion message.

A case where the first condition determination is false will be disclosed. In procedure (B) of FIG. 6, the AMF transmits a registration reject message to the UE via the 5G AN (gNB) as a response message to the registration request message (S812). The registration reject message is a NAS message transmitted and/or received on the N1 interface, but is transmitted and/or received in a state of being included in the RRC message between the UE and the 5G AN (gNB).

The AMF may transmit the registration reject message to indicate that a request for the UE via the registration request message has been rejected. The AMF may transmit the registration reject message including information indicating the reason of the rejection or may transmit the reason of the rejection. The UE may receive information indicating the reason that a request of the UE has been rejected to recognize that a request of the UE has been rejected. The reason of rejection may indicate that the content indicated by the identification information received by the AMF is not permitted.

The UE receives the registration reject message via the 5G AN (gNB) (S812). The UE can recognize that a request of the UE via the registration request message has been rejected and recognize the contents of various identification information included in the registration reject message by receiving the registration reject message. In a case where the UE does not receive the registration reject message after transmitting the registration request message in a case that a predetermined period has elapsed, the UE may recognize that a request of the UE has been rejected. Each of the apparatuses completes procedure (B) in the present procedure based on the transmission and/or reception of the registration reject message.

Procedure (B) of FIG. 6 may be initiated in a case where procedure (A) of FIG. 6 is stopped. In a case where the fourth condition determination is true in procedure (A) of FIG. 6, the AMF may transmit the registration reject message including an SM message indicating rejection such as a PDU session establishment reject message or may indicate that the procedure for SM has been rejected by including the SM message indicating rejection. The UE may further receive the SM message indicating rejection, such as a PDU session establishment reject message, or may recognize that the procedure for SM has been rejected.

Each of the apparatuses completes the registration procedure based on the completion of procedure (A) or (B) of FIG. 6. Each of the apparatuses may transition to a state where the UE is registered in the network (RM_REGISTERED state) based on the completion of procedure (A) in FIG. 6, may maintain a state where the UE is not registered in the network (RM_DEREGISTERED state) based on the completion of procedure (B) in FIG. 6, or may transition to a state where the UE is not registered in the network. In addition, transition to each state of each apparatus may be performed based on the completion of the registration procedure, or may be performed based on the establishment of a PDU session.

Each apparatus may perform processing based on information transmitted and/or received in the registration procedure, based on the completion of the registration procedure. For example, in a case where the UE transmits and receives information indicating that some of the requests of the UE have been rejected, the UE may recognize the reason that the requests of the UE have been rejected. Each of the apparatuses may perform the present procedure again based on the reason that the requests of the UE have been rejected, or may perform a registration procedure for the core network_B or another cell.

The UE may store the identification information received together with the registration accept message and/or the registration reject message, based on the completion of the registration procedure, or may recognize the determination of the network.

For example, in a case where the UE has received the 21st identification information and/or the 22nd identification information, the UE may recognize that the use of the control plane CIoT 5GS optimization has been accepted. The 21st identification information may indicate the control plane CIoT 5GS optimization. The 22nd identification information may indicate the support of the control plane CIoT 5GS optimization.

The UE may recognize that the use of the user plane CIoT 5GS optimization has been accepted in a case where the 21st identification information, the 23rd identification information, and/or the 24th identification information have been received. The 21st identification information may indicate the user plane CIoT 5GS optimization. The 23rd identification information may indicate the support of the user plane CIoT 5GS optimization. The 24th identification information may indicate the support of data communication using a communication path of a user plane.

In a case where the UE has received the 25th identification information, the UE may recognize that the use of the header compression for control plane CIoT 5GS optimization has been accepted. The 25th identification information may indicate the support of the header compression for control plane CIoT 5GS optimization.

In a case where the UE has received the 26th identification information, the UE may recognize that the use of an enhanced coverage is restricted. The 26th identification information may indicate that the use of an enhanced coverage is restricted.

In a case where the UE has received the 27th identification information, the UE may recognize that the use of the 5GMM-CONNECTED mode with RRC inactive indication has been accepted. The 27th identification information may indicate the support of the 5GMM-CONNECTED mode with RRC inactive indication.

In a case where the UE has received the 28th identification information, the UE may recognize that a request for the use of the NSSAI indicated by the eighth identification information included in the registration request message and transmitted and/or the S-NSSAI included in the eighth identification information has been accepted. In a case where the UE has received the 28th identification information, the UE may recognize the NSSAI and/or the S-NSSAI for which a request of use has been accepted, or may store the NSSAI and/or the S-NSSAI in context.

In a case where the UE has received the 29th identification information and/or the 30th identification information, the UE may recognize that the network supports the establishment of a plurality of user plane radio bearers and/or the execution of QoS processing in the currently connected RAT. In a case where the UE has received the 29th identification information and/or the 30th identification information, the UE may recognize that a request for establishing a plurality of user plane radio bearers and/or a request for transitioning to a state where QoS processing can be performed has been accepted. The 29th identification information may indicate that the multiple user plane radio bearers are supported. The 30th identification information may indicate that the establishment of a dedicated bearer is supported. The currently connected RAT may be NB-IoT or may be a RAT other than NB-IoT.

In a case where the UE has received the 31st identification information, the UE may recognize that the network supports an LADN or may recognize that connection to the LADN is permitted. In a case where the UE has received the 31st identification information, the UE may recognize a list of DNNs that can be used in the connection to the LADN and/or an area where connection to the LADN is possible or may store the list in context.

3.2.2. PDU Session Establishment Procedure

Figure 7:
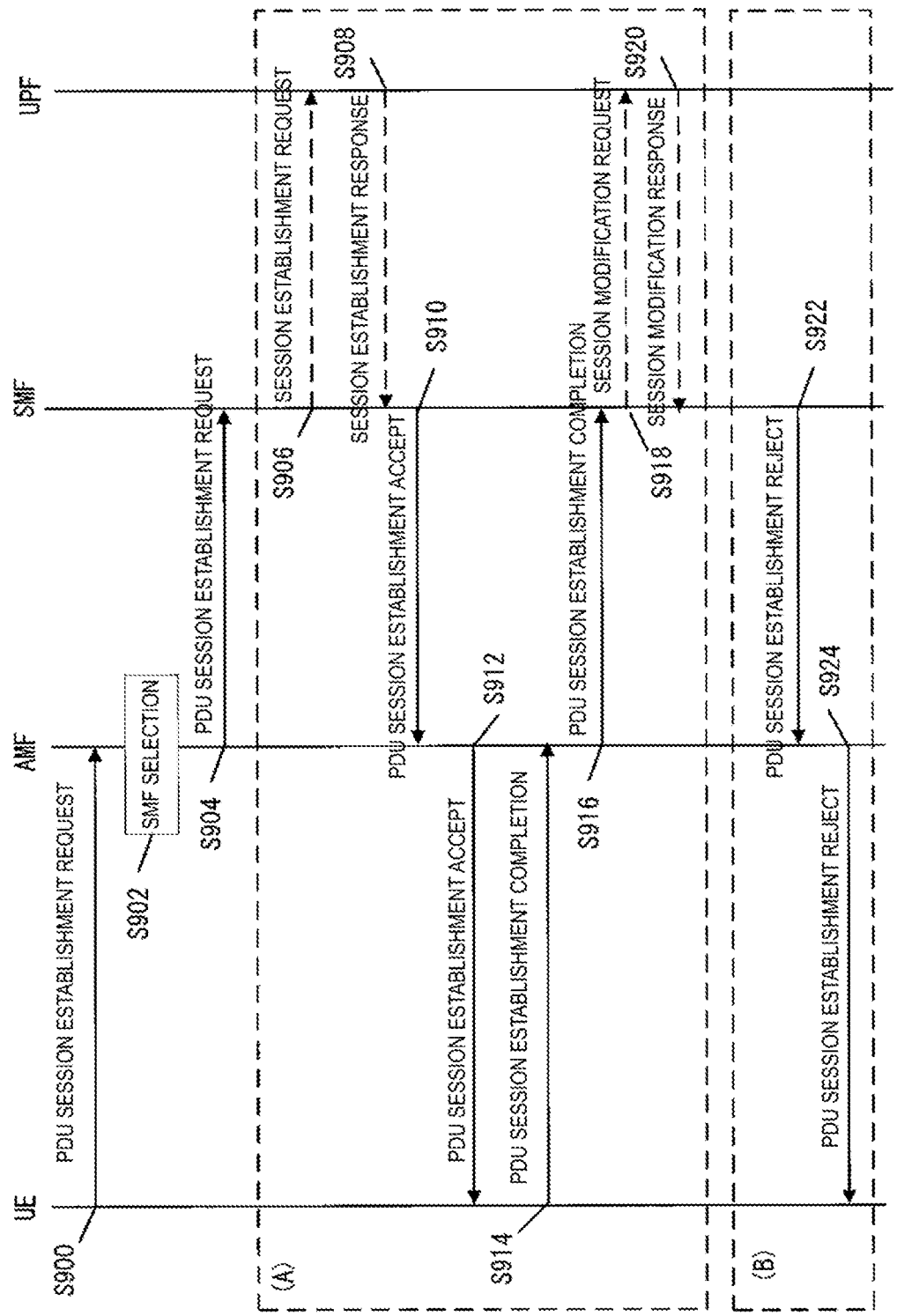
FIG. 7 illustrates a PDU session establishment procedure according to an implementation of the present disclosure.

An outline of a PDU session establishment procedure performed to establish a PDU session for a DN will be disclosed with reference to FIG. 7. FIG. 7 illustrates a PDU session establishment procedure according to an implementation of the present disclosure. The PDU session establishment procedure is a procedure in a 5GS. The PDU session establishment procedure is a procedure for each of the apparatuses to establish a PDU session. Each of the apparatuses can initiate the PDU session establishment procedure at any time at which the registration procedure is completed and the apparatus is in a registered state. Each of the apparatuses may be able to execute the PDU session establishment procedure during the registration procedure. Each of the apparatuses may establish a PDU session based on the completion of the PDU session establishment procedure. Each of the apparatuses can execute the PDU session establishment procedure a plurality of times to establish a plurality of PDU sessions.

In a case where control plane CIoT 5GS optimization can be used, the UE may initiate the PDU session establishment procedure to establish a PDU session in which the control plane CIoT 5GS optimization can be used.

The UE may initiate the PDU session establishment procedure in order to establish a PDU session in which the user plane CIoT 5GS optimization can be used in a case where the user plane CIoT 5GS optimization can be used.

In a case where the control plane CIoT 5GS optimization can be used and the user plane CIoT 5GS optimization and/or data communication using a communication path of a user plane can be used, the UE may initiate the PDU session establishment procedure in order to establish a PDU session in which a procedure for establishing a user plane radio bearer can be executed. The procedure for establishing the user plane radio bearer may be a service request procedure. The procedure for establishing the user plane radio bearer may be a service request procedure.

In a case where the use of control plane CIoT 5GS optimization and/or the header compression for control plane CIoT 5GS optimization can be used, the UE may initiate the PDU session establishment procedure in order to establish a PDU session in which a header compression function can be used.

In a case where the UE is positioned in an area where connection to the LADN is possible and/or a case where the UE is positioned in an LADN service area, the UE may initiate a PDU session establishment procedure in order to establish a PDU session for the LADN. In a case where the UE is positioned outside the LADN service area, the execution of the PDU session establishment procedure for establishing a PDU session for the LADN may be prohibited.

First, the UE transmits an NAS message including a PDU session establishment request message to the SMF via the 5G AN (gNB) and the AMF (S900), (S902), and (S904) to initiate the PDU session establishment procedure.

Specifically, the UE transmits the NAS message including the PDU session establishment request message to the AMF via the 5G AN (gNB) using the N1 interface (S900).

The UE can transmit the PDU session establishment request message and/or the NAS message including one or more pieces of identification information among at least the 41st to 44th identification information, but may transmit a different control message including the identification information, for example, a control message for a layer lower than the RRC layer (for example, the MAC layer, the RLC layer, or the PDCP layer). These pieces of identification information may be included in these messages to indicate a request of the UE. Further, two or more of these pieces of identification information may be configured as one or more pieces of identification information.

The UE may transmit the 41st identification information to indicate a request for establishing a PDU session in which only the control plane CIoT 5GS optimization can be used. The UE may transmit the 42nd identification information to indicate a request for establishing a PDU session associated with an S-NSSAI.

The UE may select an appropriate S-NSSAI from the stored S-NSSAIs and configure the selected S-NSSAI as the 42nd identification information. Specifically, in a case where the UE requests the establishment of a PDU session in which the CIoT 5GS optimization can be used, the UE may select an S-NSSAI supported by the CIoT 5GS optimization and/or an S-NSSAI for which the use of the function has been accepted and may configure the selected S-NSSAI as the 42nd identification information. The selection of the S-NSSAI may not be limited thereto.

The UE can include a DNN corresponding to the DN for which the UE requests connection in the PDU session establishment request message. In a case where the UE requests the establishment of a PDU session in which the CIoT 5GS optimization can be used, the UE may select a DNN supported by the CIoT 5GS optimization and/or a DNN for which the use of the function has been accepted, and may include the selected DNN in the PDU session establishment request message.

In a case where the UE requests the establishment of a PDU session for the LADN, the UE may select an LADN DNN as a DNN and may transmit the PDU session establishment request message including the selected DNN. The UE may select the DNN from among the stored LADN information. The stored LADN information may be information received from the network in the registration procedure and/or the UE configuration update procedure, or may be information configured in the UE in advance.

The UE can generate a PDU session ID and include the generated PDU session ID in the PDU session establishment request message. The UE can include a request type indicating the purpose of establishing a PDU session in the PDU session establishment request message. The request type includes an initial request, an existing PDU session, and an initial emergency request. The initial request is designated in a case where a new non-emergency PDU session is requested to be established. The existing PDU session is designated in a case of performing handover of a non-emergency PDU session between a 3GPP access and a non-3GPP access or transfer of PDN connection from an EPS to a 5GS. The initial emergency request is designated in a case where a new emergency PDU session is requested to be established.

The UE can designate a PDU session type indicating the type of PDU session requested to be established. As disclosed previously, any one of IPv4, IPv6, IP, Ethernet, and Unstructured can be designated as the PDU session type. The UE can include an SSC mode of the PDU session requested to be established in the PDU session establishment request message.

In a case where the UE supports the control plane CIoT 5GS optimization and/or the header compression for control plane CIoT 5GS optimization, the UE may include configuration information of a header compression function (header compression configuration IE) in the PDU session establishment request message. In more detail, in a case where the PDU session type is any one of IPv4, IPv6, and IP and the UE supports the control plane CIoT 5GS optimization and/or the header compression for control plane CIoT 5GS optimization, the UE may include the configuration information of the header compression function in the PDU session establishment request message.

In a case where the PDU session type is set to be any one of IPv4, IPv6, and IP, and the support of the control plane CIoT 5GS optimization and/or the header compression for control plane CIoT 5GS optimization is indicated by a registration request message, the UE may further include the configuration information of the header compression function in the PDU session establishment request message.

In a case where the UE supports the control plane CIoT 5GS optimization and/or the header compression for control plane CIoT 5GS optimization, the UE may include the configuration information of the header compression function (header compression configuration IE) in the PDU session establishment request message. In more detail, in a case where the PDU session type is any one of IPv4, IPv6, and IP and the UE supports the control plane CIoT 5GS optimization and/or the header compression for control plane CIoT 5GS optimization, the UE may further include the configuration information of the header compression function in the PDU session establishment request message, in addition to the 42nd identification information.

In a case where the PDU session type is set to be any one of IPv4, IPv6, and IP, and the support of the control plane CIoT 5GS optimization and/or the header compression for control plane CIoT 5GS optimization of the UE is indicated by a registration request message, the UE may further include the configuration information of the header compression function in the PDU session establishment request message.

In contrast, in a case where the PDU session type is not IPv4, IPv6, or IP or in a case where the U does not support the control plane CIoT 5GS optimization and/or the header compression for control plane CIoT 5GS optimization, the UE may not include the configuration information of the header compression function in the PDU session establishment request message.

The UE may transmit the 43rd identification information to request the establishment of the PDU session of the SSC mode indicated by the 43rd identification information or may request an SSC mode associated with the established PDU session. The information SSC mode indicated by the 43rd identification information may be any one of the "SSC mode 1", the "SSC mode 2", and the "SSC mode 3".

In a case where the control plane CIoT 5GS optimization can be used, the UE may transmit the 43rd identification information for setting the SSC mode 1. The UE may transmit the 43rd identification information for setting the SSC mode 2 or the SSC mode 3 even in a case where the control plane CIoT 5GS optimization can be used. The UE may omit the transmission of the 43rd identification information in a case where the control plane CIoT 5GS optimization can be used.

In a case that the AMF receives a NAS message including the PDU session establishment request message (S900), the AMF takes out the PDU session establishment request message from the NAS message and selects an SMF as a transfer destination of the PDU session establishment request message (S902). The AMF may select the SMF which is a transfer destination based on the PDU session establishment request message, pieces of identification information included in the NAS message, subscriber information, capability information of the network, an operator policy, the state of the network, registration information of a user, context stored in the AMF, and/or the like.

The AMF transfers the PDU session establishment request message to the selected SMF via the N11 interface (S904).

In a case that the SMF receives the PDU session establishment request message (S904), the SMF recognizes various identification information included in the PDU session establishment request message. Then, the SMF executes the third condition determination. The third condition determination is performed to determine whether or not the SMF accepts a request of the UE. In the third condition determination, the SMF determines whether or not the third condition determination is true or false. The SMF initiates procedure (A) of FIG. 7 in a case where the third condition determination is true, and the SMF initiates procedure (B) of FIG. 7 in a case where the third condition determination is false.

The third condition determination may be executed based on the PDU session establishment request message, pieces of identification information included in the PDU session establishment request message, subscriber information, capability information of the network, an operator policy, the state of the network, registration information of a user, context stored in the SMF, and/or the like. For example, the third condition determination may be true in a case where the network permits a request of the UE. The third condition determination may be false in a case where the network does not permit a request of the UE. The third condition determination may be true in a case where the network as a connection destination of the UE and/or an apparatus in the network supports a function requested by the UE, and the third condition determination may be false in a case where the network does not support the function requested by the UE. The third condition determination may be true in a case where identification information to be transmitted and/or received is permitted, and the third condition determination may be false in a case where the identification information to be transmitted and/or received is not permitted. It is noted that conditions for determining whether the third condition determination is true or false may not be limited to the previously-disclosed conditions.

Actions in a case where the third condition determination is true, specifically actions of procedure (A) of FIG. 7 will be disclosed. The SMF selects an UPF which is an establishment destination of a PDU session, transmits a session establishment request message to the selected UPF via the N4 interface (S906), and initiates procedure (A) of FIG. 7.

The SMF may select one or more UPFs based on the pieces of identification information acquired based on the reception of the PDU session establishment request message, subscriber information, capability information of the network, an operator policy, the state of the network, registration information of a user, context stored in the SMF, and/or the like. In a case where a plurality of UPFs are selected, the SMF may transmit the session establishment request message to each of the UPFs.

The UPF receives the session establishment request message from the SMF via the N4 interface (S906) and creates context for a PDU session. The UPF transmits the session establishment response message to the SMF via the N4 interface based on the reception of the session establishment request message and/or the creation of the context for the PDU session (S908).

The SMF receives the session establishment response message from the UPF via the N4 interface as a response message to the session establishment request message (S908). The SMF may perform address allocation of an address to be allocated to the UE based on the reception of the PDU session establishment request message, the selection of the UPF, the reception of the session establishment response message, and/or the like.

The SMF transmits the PDU session establishment accept message to the UE via the AMF, based on the reception of the PDU session establishment request message, the selection of the UPF, the reception of the session establishment response message, and/or the completion of the address allocation of the address to be allocated to the UE (S910) (S912). Specifically, in a case that the SMF transmits the PDU session establishment accept message to the AMF via the N11 interface (S910), the AMF having received the PDU session establishment request message transmits a NAS message including the PDU session establishment accept message to the UE via the N1 interface (S912).

The PDU session establishment accept message is a NAS message, and may be a response message to the PDU session establishment request. The PDU session establishment accept message can indicate that the establishment of the PDU session has been accepted.

The SMF and the AMF may transmit the PDU session establishment accept message to indicate that a request of the UE according to the PDU session establishment request has been accepted.

The SMF and the AMF may transmit one or more pieces of identification information, among at least the 51st to 53rd identification information, included in the PDU session establishment accept message. The SMF and the AMF may transmit these pieces of identification information to indicate that the network supports each function or indicate that a request of the UE has been accepted. Further, two or more of these pieces of identification information may be configured as one or more pieces of identification information. Information indicating the support of each function and information indicating a request for the use of each function may be transmitted and/or received as the same identification information or may be transmitted and/or received as different identification information.

The SMF and the AMF may transmit the 51st identification information to indicate the acceptance of establishment of a PDU session in which only the control plane CIoT 5GS optimization can be used. The SMF and the AMF may transmit the 52nd identification information to indicate the acceptance of establishment of a PDU session associated with an S-NSSAI.

The SMF and the AMF may select an appropriate S-NSSAI from among the S-NSSAI indicated by the received 42nd identification information or the stored S-NSSAI and set the selected S-NSSAI as the 52nd identification information. Specifically, in a case where the SMF and the AMF accept the establishment of a PDU session in which the CIoT 5GS optimization can be used, the SMF and the AMF may select an S-NSSAI in which the CIoT 5GS optimization is supported and/or an S-NSSAI in which the use of the function has been accepted and may set the selected S-NS- SAI as the 52nd identification information. The selection of the S-NSSAI may not be limited thereto.

The SMF and the AMF may transmit the 53rd identification information to indicate that the PDU session of the SSC mode indicated by the 53rd identification information is established or indicate an SSC mode associated with the established PDU session. The SMF and the AMF may transmit the 53rd identification information to indicate that a request for the establishment of the PDU session of the SSC mode indicated by the 43rd identification information has been accepted. The SSC mode indicated by the 53rd identification information may be any one of the "SSC mode 1", the "SSC mode 2", and the "SSC mode 3".

In a case where the SMF receives the 43rd identification information, the SMF may determine the SSC mode indicated by the 43rd identification information as the SSC mode associated with the established PDU session based on subscriber information and/or configuration information of the SMF. In a case where the SMF has not received the 43rd identification information, the SMF may determine a default SSC mode and/or the SSC mode associated with the configuration information of the SMF as the SSC mode associated with the established PDU session. The SMF may set the SSC mode associated with the established PDU session as the 53rd identification information.

In a case where the control plane CIoT 5GS optimization can be used, the SMF may determine the SSC mode 1 as the SSC mode associated with the established PDU session. The 53rd identification information may indicate the SSC mode 1. Even in a case that the control plane CIoT 5GS optimization can be used, the SMF may determine the SSC mode 2 or the SSC mode 3 as the SSC mode associated with the established PDU session. The 53rd identification information may indicate the SSC mode 2 or the SSC mode 3. In a case where the control plane CIoT 5GS optimization can be used, the SMF may determine that an SSC mode is not adapted to the established PDU session. In this case, any SSC mode may be set as the 53rd identification information, or the transmission and/or reception of the 53rd identification information may be omitted.

The SMF and the AMF may select and determine which identification information among the 41st identification information to the 45th identification information is included in the PDU session establishment accept message, based on the received pieces of identification information, subscriber information, capability information of the network, an operator policy, the state of the network, registration information of a user, context stored in the AMF, and/or the like.

The SMF and the AMF can include a DNN corresponding to a DN permitting the connection of the UE in the PDU session establishment accept message. In a case where the established PDU session is a PDU session for an LADN, the SMF and the AMF may include an LADN DNN in the PDU session establishment accept message.

The SMF and the AMF can include a selected and/or permitted PDU session ID in the PDU session establishment accept message. The SMF and the AMF can designate a PDU session type indicating a selected and/or permitted PDU session type. As disclosed previously, any one of IPv4, IPv6, Ethernet, and Unstructured can be designated as the PDU session type. The SMF and the AMF can include an SSC mode of a selected and/or permitted PDU session in the PDU session establishment accept message.

The SMF and the AMF can include an approved QoS rule group in the PDU session establishment accept message. One or a plurality of QoS rules may be included in the approved QoS rule group. In a case where a plurality of QoS flows and/or user plane radio bearers are established, a plurality of QoS rules may be included in an approved QoS rule group. In contrast, in a case where only one QoS flow and/or user plane radio bearer is established, one QoS rule may be included in an approved QoS rule group.

In a case where the SMF and the AMF transmit and/or receive the 29th identification information and/or the 30th identification information in the registration procedure, the SMF and the AMF may transmit an approved QoS rule group including a plurality of QoS rules. In contrast, in a case where the SMF and the AMF do not transmit and/or receive the 29th identification information and/or the 30th identification information in the registration procedure, the SMF and the AMF may transmit an approved QoS rule group including one QoS rule. Determination of whether or not a plurality of QoS rules are included in an approved QoS rule group may not be limited thereto.

In a case where the configuration information of the header compression function is included in the PDU session establishment request message, the SMF and/or the AMF may transmit the PDU session establishment accept message including the configuration information of the header compression function.

The SMF may transmit the PDU session establishment accept message including information indicating that some of the requests of the UE have been rejected, or may transmit information indicating that some of the requests of the UE have been rejected to indicate the reason that some of the requests of the UE have been rejected. The UE may recognize the reason that some of the requests of the UE have been rejected by receiving information indicating that some of the requests of the UE have been rejected. The reason of the rejection may indicate that the content indicated by the identification information received by the SMF is not permitted.

In a case that the UE receives the NAS message including the PDU session establishment accept message from the AMF via the N1 interface (S912), the UE transmits the PDU session establishment completion message to the SMF via the AMF (S914) (S916). The UE may receive the PDU session establishment accept message to detect that a request of the UE according to the PDU session establishment request has been accepted.

Specifically, the UE transmits the PDU session establishment completion message to the AMF via the N1 interface (S914). In a case that the AMF receives the PDU session establishment completion message from the UE, the AMF transmits the PDU session establishment completion message to the SMF via the N11 interface (S916).

The PDU session establishment completion message transmitted to the SMF by the AMF may be a response message to the PDU session establishment accept message transmitted to the AMF from the SMF in S910. The PDU session establishment completion message may be a NAS message. The PDU session establishment completion message may be a message indicating that the PDU session establishment procedure has been completed.

In a case that the SMF receives the PDU session establishment completion message from the AMF via the N1 1 interface (S916), the SMF can execute the second condition determination. The second condition determination is performed to determine the type of message to be transmitted and/or received on the N4 interface. In a case where the second condition determination is true, the SMF receives a session modification accept message transmitted from the UPF as a response message (S920) in a case of transmitting the session modification request message to the UPF via the N4 interface (S918). In a case where the second condition determination is false, the SMF receives a session modification accept message transmitted from the UPF as a response message (S920) in a case of transmitting the session establishment request message to the UPF via the N4 interface (S918).

The second condition determination may be executed based on whether or not a session on the N4 interface for a PDU session has been established. For example, the second condition determination may be true in a case where a session on the N4 interface for a PDU session has been established. The second condition determination may be false in a case where a session on the N4 interface for a PDU session has not been established. Conditions for determining whether the second condition determination is true or false are not limited to the previously-disclosed conditions.

Each of the apparatuses completes procedure (A) in the PDU session establishment procedure, based on the transmission and/or reception of the PDU session establishment completion message, the transmission and/or reception of the session modification response message, and/or the transmission and/or reception of the session establishment response message. In a case that procedure (A) in the present procedure has been completed, the UE is in a state where a PDU session for a DN has been established.

Procedure (B) in the PDU session establishment procedure will be disclosed. The SMF transmits a PDU session establishment reject message to the UE via the AMF (S922) (S924). Specifically, the SMF transmits the PDU session establishment reject message to the AMF via the N1 interface (S922). In a case that the AMF receives the PDU session establishment request message from the SMF via the N11 interface (S922), the AMF transmits the PDU session establishment reject message to the UE using the N1 interface (S924).

The PDU session establishment reject message may be a NAS message. The PDU session establishment reject message may be a message indicating that the establishment of a PDU session has been rejected.

The SMF may transmit the PDU session establishment reject message to indicate that a request of the UE according to the PDU session establishment request has been rejected. The SMF may transmit information indicating the reason of the rejection in the PDU session establishment reject message, or may indicate the reason of the rejection by transmitting the reason of the rejection. The UE may recognize the reason that a request of the UE has been rejected by receiving information indicating the reason of the rejection. The reason of the rejection may indicate that contents of the identification information received by the SMF are not permitted.

The UE can receive the PDU session establishment reject message to recognize that a request of the UE according to the PDU session establishment request message has been rejected and recognize contents of various kinds of identification information included in the PDU session establishment reject message.

Each of the apparatuses completes the PDU session establishment procedure based on the completion of procedure (A) or (B) of FIG. 7. Each of the apparatuses may transition to a state where a PDU session has been established, based on the completion of procedure (A) of FIG. 7, or may recognize that the PDU session establishment procedure has been rejected or may transition to a state where a PDU session has not been established, based on the completion of procedure (B) of FIG. 7. The UE can communicate with a DN using the established PDU session by completing procedure (A) of FIG. 7.

Based on the completion of the PDU session establishment procedure, each of the apparatuses may perform processing based on information transmitted and/or received in the PDU session establishment procedure. For example, in a case where each of the apparatuses transmits and/or receives information indicating that some of the requests of the UE have been rejected, the apparatuses may recognize the reason that the requests of the UE have been rejected. Each of the apparatuses may perform the PDU session establishment procedure again based on the reason that the requests of the UE have been rejected, or may perform the PDU session establishment procedure on another cell.

The UE may store the PDU session establishment accept message and/or the identification information received together with the PDU session establishment reject message, based on the completion of the PDU session establishment procedure, or may recognize the determination of the network.

For example, in a case where the UE has received the 51st identification information, the UE may recognize that the establishment of a PDU session in which only the control plane CIoT 5GS optimization can be used has been accepted. In a case where the UE has received the 52nd identification information, the UE may recognize that the establishment of a PDU session associated with an S-NSSAI has been accepted.

In a case where the UE has received the PDU session establishment reject message as a response to the PDU session establishment request message including the 41st identification information, the UE may recognize that the establishment of a PDU session in which only the control plane CIoT 5GS optimization can be used has been rejected or may recognize that such a PDU session cannot be established.

In a case where the UE has received the PDU session establishment reject message as a response to the PDU session establishment request message including the 42nd identification information, the UE may recognize that the establishment of a PDU session associated with an S-NSSAI indicated by the 42nd identification information has been rejected or may recognize that such a PDU session cannot be established.

In a case where the UE has received the PDU session establishment reject message, the UE may transmit a PDU session establishment request message not including the 41st identification information to the network or may transmit a PDU session establishment request message including the 42nd identification information indicating an S-NSSAI different from the S-NSSAI indicated by the 42nd identification information transmitted before to the network.

In a case where the UE has established a PDU session in which a procedure for establishing a user plane radio bearer can be executed, the UE may initiate a service request procedure in order to establish the user plane radio bearer of the PDU session.

In a case where the UE has received the 53rd identification information, the UE may recognize that the PDU session of the SSC mode indicated by the 53rd identification information is established, or may recognize the SSC mode associated with the established PDU session. In a case where the UE has received the 53rd identification information, the UE may store the SSC mode indicated by the 53rd identification information in the context of the established PDU session. In a case where the UE has received the 53rd identification information, the UE may recognize that a request for the establishment of the PDU session of the SSC mode indicated by the 43rd identification information has been accepted.

In a case where the UE has not received the 53rd identification information, the UE may recognize that an SSC mode is not adapted to the established PDU session. In a case where the control plane CIoT 5GS optimization can be used even in a case where the UE has received the 53rd identification information, the UE may ignore the 53rd identification information or may delete the SSC mode from the context of the established PDU session.

Even in a case where the control plane CIoT 5GS optimization can be used, the UE may recognize that the SSC mode indicated by the 53rd identification information is the SSC mode associated with the established PDU session, or may store the SSC mode indicated by the 53rd identification information in the context of the established PDU session.

In a case where the UE has received an LADN DNN, the UE may recognize that a PDU session for an LADN has been established, may store an LADN DNN in which the established PDU session is treated as a PDU session for an LADN DNN in the context of the established PDU session, or may treat the established PDU session as a PDU session for an LADN DNN.

In a case where the UE has received an approved QoS rule group including a plurality of QoS rules, the UE may recognize that QoS processing can be executed in the established PDU session. In a case where the UE has received an approved QoS rule group including a plurality of QoS rules, the UE may recognize that a plurality of QoS flows are established in the present procedure, or may recognize that a plurality of user plane radio bearers are established. In contrast, in a case where the UE has received an approved QoS rule group including one QoS rule, the UE may recognize that one QoS flow is established in the present procedure, or may recognize that one user plane radio bearer is established.

3.2.3. UE Configuration Update Procedure

Figure 8:
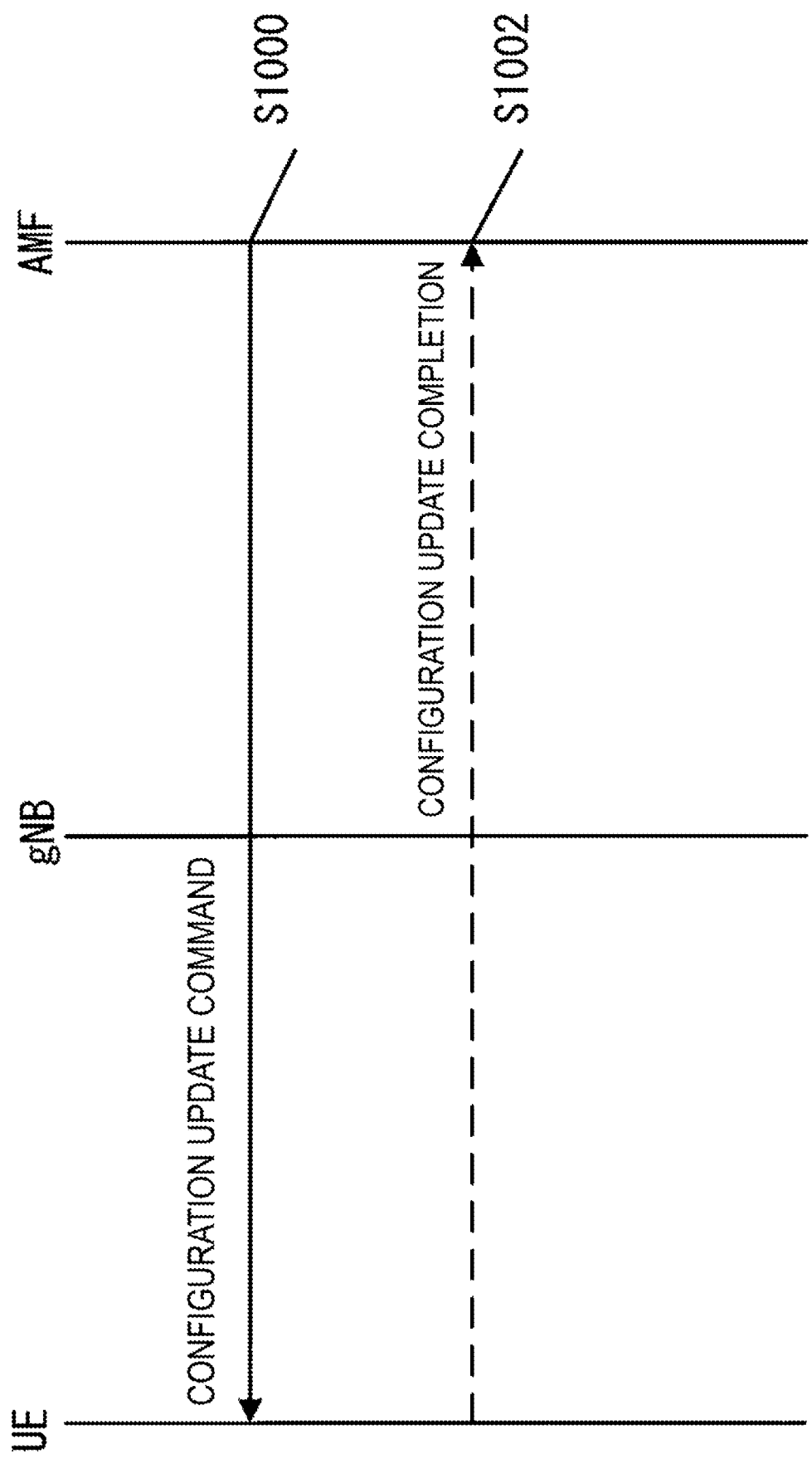
FIG. 8 illustrates a UE configuration update procedure according to an implementation of the present disclosure.

A generic UE configuration update procedure will be disclosed with reference to FIG. 8. FIG. 8 illustrates a UE configuration update procedure according to an implementation of the present disclosure. The UE configuration update procedure is for a core network to update configuration information of the UE. The UE configuration update procedure may be for network-initiated and executed mobility management executed on the UE registered in the network.

An apparatus in the core network, such as the AMF, may initiate the procedure based on the update of the network configuration and/or the update of an operator policy. A trigger of the procedure may be the detection of mobility of the UE, may be the detection of a change in the state of the UE, the access network, and/or the core network, or may be a change in the state of a network slice. A trigger of the procedure may be the reception of a request received from a DN and/or an application server of the DN, may be a change in the configuration of the network, or may be a change in an operator policy. A trigger of the procedure may be the expiration of a timer. A trigger for the apparatus in the core network to initiate the procedure is not limited thereto. The procedure may be executed at any time after the previously-disclosed registration procedure and/or PDU session establishment procedure is completed. The UE configuration update procedure may be executed at any time in a state where each of the apparatuses has established 5GMM context and/or in a state where each of the apparatuses is in a 5GMM connected mode.

Each of the apparatuses may transmit and/or receive a message including identification information for changing the configuration information of the UE and/or identification information for stopping or changing a function being executed by the UE during the UE configuration update procedure. Each of the apparatuses may update the configuration information to a configuration indicated by the network or may initiate behavior indicated by the network, based on the completion of the UE configuration update procedure.

The UE may update the configuration information of the UE based on the control information transmitted and/or received by the UE configuration update procedure. The UE may stop the function being executed or may initiate a new function in association with the update of the configuration information of the UE. The apparatus in the core network may initiate the procedure and transmit a control message and control information to the UE to cause the UE to update the configuration information of the UE that can be identified using the control information. The apparatus in the core network may update the configuration information of the UE to stop the function being executed by the UE or cause the UE to initiate a new function.

The AMF initiates the UE configuration update procedure by transmitting a configuration update command message to the UE via the 5G AN (or the gNB) (S1000).

The AMF may transmit one or more pieces of identification information, among at least the 61st to 69th identification information, included in the registration accept message. The AMF may transmit these pieces of identification information to indicate new configuration information of the UE or request the update of the configuration information of the UE. Two or more pieces of the identification information may be configured as one or more pieces of identification information. Information indicating the support of each function and information indicating a request for the use of each function may be transmitted and/or received as the same identification information or may be transmitted and/or received as different identification information.

The AMF may transmit the 61st identification information to indicate new information of CIoT 5GS optimization or indicate invalidation of the information of the CIoT 5GS optimization stored in the UE. The AMF may transmit the 61st identification information to indicate that the currently used CIoT 5GS optimization is required to be updated, request the change of the currently used CIoT 5GS optimization, or indicate the changed CIoT 5GS optimization.

The AMF may transmit the 62nd identification information to indicate new support information of the control plane CIoT 5GS optimization or indicate invalidation of the support information of the control plane CIoT 5GS optimization stored in the UE. The AMF may transmit the 62nd identification information to request the change of the support information of the control plane CIoT 5GS optimization or indicate the support information of the changed control plane CIoT 5GS optimization.

The AMF may transmit the 63rd identification information to indicate new support information of the user plane CIoT 5GS optimization or indicate invalidation of the support information of the user plane CIoT 5GS optimization stored in the UE. The AMF may transmit the 63rd identification information to request the change of the support information of the user plane CIoT 5GS optimization or indicate the support information of the changed user plane CIoT 5GS optimization.

The AMF may transmit the 64th identification information to indicate new support information of data communication using a communication path of a user plane or indicate invalidation of the support information of the data communication using the communication path of the user plane stored in the UE. The AMF may transmit the 64th identification information to request the change of the support information of the data communication using the user plane communication path, or indicate the changed support information of the data communication using the communication path of the user plane.

The UE may transmit one or more pieces of identification information among the 61st identification information and/or the 62nd to 64th identification information to indicate that the currently used CIoT 5GS optimization is required to be changed or request the change of the currently used CIoT 5GS optimization to CIoT 5GS optimization indicated by identification information.

Specifically, the AMF may transmit the 61st identification information and/or the 62nd identification information to request the change of the currently used CIoT 5GS optimization to control plane CIoT 5GS optimization. The 61st identification information may indicate the control plane CIoT 5GS optimization. The 62nd identification information may indicate support of the control plane CIoT 5GS optimization.

The AMF may transmit the 61st identification information, the 63rd identification information, and/or the 64th identification information to request the change of the currently used CIoT 5GS optimization to user plane CIoT 5GS optimization. The 61st identification information may indicate the user plane CIoT 5GS optimization. The 63rd identification information may indicate the support of the user plane CIoT 5GS optimization. The 64th identification information may indicate the support of data communication using a communication path of a user plane.

The AMF may transmit the 65th identification information to indicate new support information of header compression for control plane CIoT 5GS optimization or indicate invalidation of the support information of the header compression for control plane CIoT 5GS optimization stored in the UE. The AMF may transmit the 65th identification information to request the change of the support information of the header compression for control plane CIoT 5GS optimization or indicate the changed support information of the header compression for control plane CIoT 5GS optimization.

The AMF may transmit the 66th identification information to indicate new information of a restriction related to the use of an enhanced coverage or indicate invalidation of the information of the restriction related to the use of an enhanced coverage which is stored in the UE. The AMF may transmit the 66th identification information to request the change of the information of a restriction related to the use of an enhanced coverage or indicate the changed information of the restriction related to the use of an enhanced coverage. The information of the restriction related to the use of an enhanced coverage may indicate whether or not the use of the enhanced coverage is restricted or may be the support information of the restriction related to the use of enhanced coverage.

The AMF may transmit the 67th identification information to indicate new support information of a 5GMM-CONNECTED mode with RRC inactive indication or indicate invalidation of the support information of the 5GMM-CONNECTED mode with RRC inactive indication stored in the UE. The AMF may transmit the 67th identification information to request the change of the support information of the 5GMM-CONNECTED mode with an RRC inactive indication or indicate the changed support information of the 5GMM-CONNECTED mode with the RRC inactive indication.

The AMF may transmit the 68th identification information to indicate new LADN information or indicate invalidation of the LADN information stored in the UE. The AMF may transmit the 68th identification information to request the change of the LADN information or indicate the changed LADN information.

The AMF may transmit the 68th identification information to request the update of a list of DNNs that can be used in the connection to the LADN and/or indicate the updated list of the DNNs that can be used in the connection to the LADN. The AMF may transmit the 68th identification information to request the update of an area in which connection to the LADN can be performed or indicate the updated area in which connection to the LADN can be performed.

The AMF may transmit the 69th identification information to indicate that a registration procedure is required to be executed. The AMF may transmit the 69th identification information in addition to one or more pieces of identification information among the 61st to 68th identification information to request the execution of the registration procedure or indicate that renegotiation between the pieces of information is necessary. In a case where the AMF includes one or more pieces of identification information among the 61st to 68th identification information in a configuration update command message, the AMF may also transmit the configuration update command message including the 69th identification information.

The AMF may select and determine which identification information among the 61st to 69th identification information is included in the configuration update command message, based on the received pieces of identification information, subscriber information, capability information of the network, an operator policy, the state of the network, registration information of a user, context stored in the AMF, and/or the like.

The AMF may transmit the configuration update command message based on the received pieces of identification information, subscriber information, capability information of the network, an operator policy, the state of the network, registration information of a user, context stored in the AMF, and/or the like to indicate a request for the update of configuration information of the UE.

The UE receives the configuration update command message via the 5G AN (gNB) (S1000). The UE may update the configuration information of the UE based on the configuration update command message and/or the identification information included in the configuration update command message. The UE may transmit a configuration update completion message to the AMF via the 5G AN (gNB) as a response message to the configuration update command message, based on the identification information included in the configuration update command message (S1002).

In a case where the UE transmits the configuration update command message, the AMF receives a configuration update completion message via the 5G AN (gNB) (S1002). Each of the apparatuses completes the UE configuration update procedure based on the transmission and/or reception of the configuration update command message and/or the configuration update completion message.

Each of the apparatuses may perform processing based on the information transmitted and/or received in the UE configuration update procedure, based on the completion of the procedure. For example, in a case where update information for the configuration information is transmitted and/or received, each of the apparatuses may update the configuration information. In a case where information indicating that the registration procedure is required to be executed is transmitted and/or received, the UE may initiate the registration procedure based on the completion of the present procedure.

The UE may store the identification information received together with the configuration information command message based on the completion of the UE configuration update procedure, or may recognize the determination of the network. For example, the UE may receive the 61st identification information to recognize that the information indicated by the 61st identification information is new information of the CIoT 5GS-optimization or recognize that the new information of the CIoT 5GS optimization is valid. The UE may receive the 61st identification information to store the new information of the CIoT 5GS optimization or recognize that the stored information of the CIoT 5GS optimization is invalid.

The information of the CIoT 5GS optimization may indicate the CIoT 5GS optimization being used. The UE may receive the 61st identification information to validate the new information of the CIoT 5GS optimization or invalidate the stored information of the CIoT 5GS optimization.

The UE may receive the 62nd identification information to recognize that the information indicated by the 62nd identification information is new support information of control plane CIoT 5GS optimization or recognize that the new support information of the control plane CIoT 5GS optimization is valid. The UE may receive the 62nd identification information to store the new support information of the control plane CIoT 5GS optimization or recognize that the stored support information of the control plane CIoT 5GS optimization is invalid. The UE may receive the 62nd identification information to validate the new support information of the control plane CIoT 5GS optimization or invalidate the stored support information of the control plane CIoT 5GS optimization.

The UE may receive the 63rd identification information to recognize that the information indicated by the 63rd identification information is new support information of user plane CIoT 5GS optimization or recognize that the new support information of the user plane CIoT 5GS optimization is valid. The UE may receive the 63rd identification information to store the new support information of the user plane CIoT 5GS optimization or recognize that the stored support information of the user plane CIoT 5GS optimization is invalid. The UE may receive the 63rd identification information to validate the new support information of the user plane CIoT 5GS optimization or invalidate the stored support information of the user plane CIoT 5GS optimization.

The UE may receive the 64th identification information to recognize that the information indicated by the 64th identification information is new support information of data communication using a communication path of a user plane or recognize that the new support information of the data communication using the communication path of the user plane is valid. The UE may receive the 64th identification information to store the new support information of the data communication using the communication path of the user plane or recognize that the stored support information of the data communication using the communication path of the user plane is invalid. The UE may receive the 64th identification information to validate the new support information of the data communication using the communication path of the user plane or invalidate the stored support information of the data communication using the communication path of the user plane.

The UE may receive one or more pieces of identification information among the 61st identification information and/or the 62nd to 64th identification information to recognize that the currently used CIoT 5GS optimization is required to be changed or change the currently used CIoT 5GS optimization to CIoT 5GS optimization indicated by the received identification information.

Specifically, the UE may receive the 61st identification information and/or the 62nd identification information to change the currently used CIoT 5GS optimization to control plane CIoT 5GS optimization. The 61st identification information may indicate the control plane CIoT 5GS optimization. The 62nd identification information may indicate the support of the control plane CIoT 5GS optimization.

The UE may receive the 61st identification information, the 63rd identification information, and/or the 64th identification information to change the currently used CIoT 5GS optimization to user plane CIoT 5GS optimization. The 61st identification information may indicate the user plane CIoT 5GS optimization. The 63rd identification information may indicate the support of the user plane CIoT 5GS optimization. The 64th identification information may indicate the support of data communication using a communication path of a user plane.

The UE may receive the 65th identification information to recognize that the information indicated by the 65th identification information is new support information of header compression for control plane CIoT 5GS optimization or recognize that the new support information of the header compression for control plane CIoT 5GS optimization is valid. The UE may receive the 65th identification information to store the new support information of the header compression for control plane CIoT 5GS optimization or recognize that the stored support information of the header compression for control plane CIoT 5GS optimization is invalid. The UE may receive the 65th identification information to validate the new support information of the header compression for control plane CIoT 5GS optimization or invalidate the stored support information of the header compression for control plane CIoT 5GS optimization.

The UE may receive the 66th identification information to recognize that the information indicated by the 66th identification information is new information of restriction related to the use of an enhanced coverage or recognize that the new information of restriction related to the use of an enhanced coverage is valid. The UE may receive the 66th identification information to store the new information of a restriction related to the use of an enhanced coverage or recognize that the stored information of the restriction related to the use of an enhanced coverage is invalid. The UE may receive the 66th identification information to validate the new information of the restriction related to the use of an enhanced coverage or invalidate the stored information of the restriction related to the use of an enhanced coverage.

The information of the restriction related to the use of an enhanced coverage may indicate whether or not the use of the enhanced coverage is restricted or may be support information of the restriction related to the use of an enhanced coverage. The UE may receive the 66th identification information to transition to a state where the use of the enhanced coverage is restricted or transition to a state where the use of the enhanced coverage is not restricted, based on the 66th identification information.

The UE may receive the 67th identification information to recognize that the information indicated by the 67th identification information is new support information of a 5GMM-CONNECTED mode with RRC inactive indication or recognize that the new support information of the 5GMM-CONNECTED mode with RRC inactive indication is valid. The UE may receive the 67th identification information to store the new support information of the 5GMM-CONNECTED mode with RRC inactive indication or recognize that the stored support information of the 5GMM-CONNECTED mode with RRC inactive indication is invalid. The UE may receive the 67th identification information to validate the new support information of the 5GMM-CONNECTED mode with RRC inactive indication or invalidate the stored support information of the 5GMM-CONNECTED mode with RRC inactive indication.

The UE may receive the 68th identification information to recognize that the information indicated by the 68th identification information is new LADN information or recognize that the new LADN information is valid. The UE may receive the 68th identification information to store the new LADN information or recognize that the stored LADN information is invalid. The UE may receive the 68th identification information to validate the new LADN information or invalidate the stored new LADN information.

The UE may receive the 68th identification information to change a list of DNNs that can be used in the connection to an LADN to a list of DNNs that can be used in the connection to the LADN indicated by the 68th identification information. The U E may receive the 68th identification information to change an area in which the connection to the LADN can be performed to an area in which the connection to the LADN indicated by the 68th identification information can be performed.

The UE may receive the 69th identification information to recognize that a registration procedure is required to be executed. The UE may receive the 69th identification information in addition to one or more pieces of identification information among the 61st to 68th identification information to initiate the registration procedure after the UE configuration update procedure is completed, or may execute the registration procedure to renegotiate the pieces of information between the UE and the network. The UE may further receive the 69th identification information in addition to one or more pieces of identification information among the 61st to 68th identification information to transmit a configuration update completion message to the AMF or may transmit and/or receive a network-initiated session management request message in the UE configuration update procedure, so that an apparatus in the core network can indicate to the UE to update the configuration information that has already been applied by the UE and to stop or change a function being executed by the UE.

4. First Implementation

A first implementation will be disclosed. In the first implementation, the UE selects a procedure from among first to fourth procedures and executes the selected procedure.

Specifically, in a case where the UE supports the CIoT 5GS optimization, the UE may execute the first procedure and/or the third procedure. In a case where the UE supports the CIoT 5GS optimization, and a RAT of the access network is NB-IoT and/or the mode of the UE is an NB-N1 mode, the UE may execute the second procedure.

In a case where the UE supports access to the LADN, the UE may execute the fourth procedure. In a case where the UE supports the CIoT 5GS optimization and the access to the LADN, the UE may execute both the first procedure and the fourth procedure. The first implementation is completed via the previously-disclosed processing.

In a case where a plurality of procedures among the first to fourth procedures are executed, a registration procedure disclosed in a procedure A and a registration procedure disclosed in a procedure B may be executed as the same registration procedure. In this case, a PDU session establishment procedure disclosed in procedure A and a PDU session establishment procedure disclosed in procedure B may be executed as the same PDU session establishment procedure. In a case where procedure A is a first procedure and procedure B is a fourth procedure, a UE configuration update procedure disclosed in procedure A, and the UE configuration update procedure disclosed in procedure B may be executed as the same UE configuration update procedure.

In a case where procedure A is the first procedure, procedure B may be the second procedure, third procedure, or fourth procedure. In a case where procedure A is the first procedure, procedure B may be a procedure in which the second procedure and the third procedure are combined. In a case where procedure A is the second procedure, procedure B may be the third procedure.

4.1 First Procedure

In the first procedure, the UE performs a registration procedure. Next, the UE establishes a PDU session by performing the PDU session establishment procedure and transitions to a state where communication using the PDU session can be performed between the UE and the DN. Next, the UE updates the configuration information of the UE via the UE configuration update procedure initiated by the core network. The UE may initiate the registration procedure again after the UE configuration update procedure is completed. Each of the apparatuses may change the function used in the UE configuration update procedure. The first implementation is completed via the previously-disclosed processing.

In the first implementation, each of the apparatuses may exchange support information of the CIoT 5GS optimization and/or priority information of the CIoT 5GS optimization between the UE and the network in the registration procedure, or may negotiate the CIoT 5GS optimization to be used. In the first implementation, each of the apparatuses may exchange information of restriction related to the use of an enhanced coverage between the UE and the network or may negotiate whether or not the use of an enhanced coverage is restricted in the registration procedure.

Each of the apparatuses may establish a PDU session in which the CIoT 5GS optimization is supported between the UE and the network based on the information exchanged in the registration procedure in the PDU session establishment procedure. The PDU session supported by the CIoT 5GS optimization may be a PDU session in which the control plane CIoT 5GS optimization can be used, or may be a PDU session in which the user plane CIoT 5GS optimization can be used. The PDU session supported by the CIoT 5GS optimization may be a PDU session in which the header compression for control plane CIoT 5GS optimization can be used.

Each of the apparatuses may update the support information of the CIoT 5GS optimization stored in the UE and/or the priority information of the CIoT 5GS optimization in the UE configuration update procedure, or may change the CIoT 5GS optimization to be used. Each of the apparatuses may update the information of restriction related to the use of an enhanced coverage which is stored in the UE or may change whether or not the use of the enhanced coverage is restricted in the UE configuration update procedure. The change of the CIoT 5GS optimization to be used and/or restriction related to the use of an enhanced coverage may be performed in the registration procedure executed after the UE configuration update procedure is completed. Whether the change of the CIoT 5GS optimization to be used and/or the restriction related to the use of an enhanced coverage is performed in the UE configuration update procedure, or the registration procedure performed after the UE configuration update procedure is completed is performed may be determined by transmitting and/or receiving the 69th identification information.

In a case where the core network updates the priority information of the CIoT 5GS optimization stored in the UE in the UE configuration update procedure, the core network may transmit the configuration update command message including the 61st identification information to the UE. In a case where the core network updates the support information of the control plane CIoT 5GS optimization stored in the UE in the UE configuration update procedure, the core network may transmit the configuration update command message including the 62nd identification information to the UE. In a case where the core network updates the support information of the user plane CIoT 5GS optimization stored in the UE in the UE configuration update procedure, the core network may transmit the configuration update command message including the 63rd identification information to the UE. In a case where the core network updates the support information of the data communication using the communication path of the user plane stored in the UE in the UE configuration update procedure, the core network may transmit the configuration update command message including the 64th identification information to the UE.

In a case where the core network changes the CIoT 5GS optimization to be used from the user plane CIoT 5GS optimization to the control plane CIoT 5GS optimization in the UE configuration update procedure, the core network may transmit the configuration update command message including the 61st identification information and/or the 62nd identification information to the UE.

In a case where the core network changes the CIoT 5GS optimization to be used from the user plane CIoT 5GS optimization to the control plane CIoT 5GS optimization due to the UE initiating the registration procedure after the UE configuration update procedure is completed, the core network may transmit the configuration update command message including the 69th identification information to the UE together with the 61st identification information and/or the 62nd identification information.

In a case where the core network changes the CIoT 5GS optimization to be used from the control plane CIoT 5GS optimization to the user plane CIoT 5GS optimization in the UE configuration update procedure, the core network may transmit the configuration update command message including the 61st identification information, the 63rd identification information, and/or the 64th identification information to the UE.

In a case where the core network changes the CIoT 5GS optimization to be used from the control plane CIoT 5GS optimization to the user plane CIoT 5GS optimization due to the UE initiating the registration procedure after the UE configuration update procedure is completed, the core network may transmit the configuration update command message including the 69th identification information together with the 61st identification information, the 63rd identification information, and/or the 64th identification information to the UE.

In a case where the UE has received the 61st identification information in the UE configuration update procedure, the UE may update the priority information of the CIoT 5GS optimization stored in the UE. In a case where the UE has received the 62nd identification information in the UE configuration update procedure, the UE may update the support information of the control plane CIoT 5GS optimization stored in the UE. In a case where the UE has received the 63rd identification information in the UE configuration update procedure, the UE may update the support information of the user plane CIoT 5GS optimization stored in the UE. In a case where the UE has received the 64th identification information in the UE configuration update procedure, the UE may update the support information of the data communication using the communication path of the user plane stored in the UE.

In a case where the user plane CIoT 5GS optimization is used and the UE has received the 61st identification information and/or the 62nd identification information and has not received the 69th identification information in the UE configuration update procedure, the UE may change the CIoT 5GS optimization to be used from the user plane CIoT 5GS optimization to the control plane CIoT 5GS optimization, based on the update of the priority information of the CIoT 5GS optimization and/or the support information of the control plane CIoT 5GS optimization. In a case where the user plane CIoT 5GS optimization is used and the UE has received the 69th identification information together with the 61st identification information and/or the 62nd identification information in the UE configuration update procedure, the UE may initiate the registration procedure in order to change the CIoT 5GS optimization to be used after the UE configuration update procedure is completed.

The UE may transmit the registration request message including the information received and/or updated in the UE configuration update procedure. The UE may change the CIoT 5GS optimization to be used from the user plane CIoT 5GS optimization to the control plane CIoT 5GS optimization, based on the execution of the registration procedure.

The UE may release an established PDU session based on the change of the CIoT 5GS optimization to be used to the control plane CIoT 5GS optimization, or may execute a procedure for releasing the established PDU session. The UE may change an established PDU session to a PDU session in which the control plane CIoT 5GS optimization can be used or may execute a procedure for changing the established PDU session to a PDU session in which the control plane CIoT 5GS optimization can be used, based on the change of the CIoT 5GS optimization to be used to the control plane CIoT 5GS optimization. The established PDU session may be a PDU session in which the user plane CIoT 5GS optimization can be used.

The UE may establish a PDU session in which the control plane CIoT 5GS optimization can be used by executing a PDU session establishment procedure after the CIoT 5GS optimization to be used is changed to the control plane CIoT 5GS optimization.

In a case where the control plane CIoT 5GS optimization is used and the UE has received the 61st identification information, the 63rd identification information, and/or the 64th identification information and has not received the 69th identification information in the UE configuration update procedure, the UE may change the CIoT 5GS optimization to be used from the control plane CIoT 5GS optimization to the user plane CIoT 5GS optimization, based on the update of the priority information of the CIoT 5GS optimization and/or the support information of the control plane CIoT 5GS optimization. In a case where the control plane CIoT 5GS optimization is used and the UE has received the 69th identification information together with the 61st identification information, the 63rd identification information, and/or the 64th identification information in the UE configuration update procedure, the UE may initiate the registration procedure in order to change the CIoT 5GS optimization to be used.

The UE may transmit the registration request message including the information received and/or updated in the UE configuration update procedure. The UE may change the CIoT 5GS optimization to be used from the control plane CIoT 5GS optimization to the user plane CIoT 5GS optimization, based on the execution of the registration procedure.

The UE may release an established PDU session or may execute a procedure for releasing the established PDU session, based on the change of the CIoT 5GS optimization to be used to the user plane CIoT 5GS optimization. The UE may change the established PDU session to a PDU session in which the user plane CIoT 5GS optimization can be used or may execute a procedure for changing the established PDU session to a PDU session in which the user plane CIoT 5GS optimization can be used, based on the change of the CIoT 5GS optimization to be used to the user plane CIoT 5GS optimization. The established PDU session may be a PDU session in which the control plane CIoT 5GS optimization can be used.

The UE may execute a PDU session establishment procedure after the CIoT 5GS optimization to be used is changed to the user plane CIoT 5GS optimization to establish a PDU session in which the user plane CIoT 5GS optimization can be used.

In a case where the core network updates the information of restriction related to the use of an enhanced coverage which is stored in the UE in the UE configuration update procedure, the core network may transmit the configuration update command message including the 66th identification information to the UE.

In a case where the core network changes whether or not the use of the enhanced coverage is restricted in the UE configuration update procedure, the core network may transmit the configuration update command message including the 66th identification information to the UE.

In a case where the core network changes whether or not the use of the enhanced coverage is restricted due to the UE initiating the registration procedure after the UE configuration update procedure is completed, the core network may transmit the configuration update command message including the 69th identification information together with the 66th identification information to the UE.

In a case where the UE has received the 66th identification information in the UE configuration update procedure, the UE may update the information of the restriction related to the use of an enhanced coverage which is stored in the UE.

In a case where an enhanced coverage is restricted and the UE has received the 66th identification information and has not received the 69th identification information in the UE configuration update procedure, the UE may transition to a state where an enhanced coverage is not restricted. In a case where an enhanced coverage is restricted and the UE has received the 69th identification information together with the 66th identification information in the UE configuration update procedure, the UE may initiate the registration procedure in order to change whether or not the use of an enhanced coverage is restricted after the UE configuration update procedure is completed.

The UE may transmit the registration request message including the information received and/or updated in the UE configuration update procedure. The UE may transition to a state where an enhanced coverage is not restricted, based on the execution of the registration procedure.

The UE may initiate the use of an enhanced coverage based on the transition to a state where an enhanced coverage is not restricted. The UE may communicate with the network in a new coverage after transitioning to a state where an enhanced coverage is not restricted.

In a case where an enhanced coverage is not restricted and the UE has received the 66th identification information and has not received the 69th identification information in the UE configuration update procedure, the UE may transition to a state where an enhanced coverage is restricted, based on the update of the information of restriction related to the use of an enhanced coverage. In a case where an enhanced coverage is not restricted and the UE has received the 69th identification information together with the 66th identification information in the UE configuration update procedure, the UE may initiate the registration procedure in order to change whether or not the use of an enhanced coverage is restricted after the UE configuration update procedure is completed.

The UE may transmit the registration request message including the information received and/or updated in the UE configuration update procedure. The UE may transition to a state where an enhanced coverage is restricted based on the execution of the registration procedure.

The UE may stop the use of an enhanced coverage based on the transition to a state where an enhanced coverage is restricted. The UE may communicate with the network in a new coverage after transitioning to a state where an enhanced coverage is restricted. The UE may search for and select a coverage again after transitioning to a state where an enhanced coverage is restricted.

According to the previous disclosure, each of the apparatuses can achieve the object of the first implementation. The core network may be able to initiatively achieve the object of the present procedure by executing the first implementation. The core network may be able to achieve the object of the first implementation without the need for a trigger of the UE. Each of the apparatuses may be able to achieve the object of the first implementation without executing a de-registration procedure. The trigger of the UE may be a request message transmitted from the UE to the core network. For example, the request message transmitted from the UE to the core network may be a registration request message or a service request message.

The object of the first implementation may be to update the support information of the CIoT 5GS optimization and/or the priority information of the CIoT 5GS optimization stored in the UE, and may be to change the CIoT 5GS optimization to be used. The object of the first implementation may be to update the information of the restriction related to the use of an enhanced coverage stored in the UE, or may be to change restriction related to the use of an enhanced coverage.

The registration procedure disclosed previously is the same registration procedure disclosed in chapter 3.2.1. The PDU session establishment procedure disclosed previously is the same PDU session establishment procedure disclosed in the chapter of 3.2.2. The UE configuration update procedure disclosed previously is the UE configuration update procedure disclosed in chapter 3.2.3.

4.2. Second Procedure

In the second procedure, the UE performs a registration procedure. Next, the UE establishes a PDU session by performing a PDU session establishment procedure and transitions to a state where the UE can communicate with the DN using the PDU session. The second procedure is completed via the previously-disclosed processing.

In the second procedure, each of the apparatuses may exchange support information of the CIoT 5GS optimization and/or priority information of the CIoT 5GS optimization between the UE and the network in the registration procedure, or may negotiate the CIoT 5GS optimization to be used. In the second procedure, each of the apparatuses may exchange support information for performing QoS processing between the UE and the network in the registration procedure.

Each of the apparatuses may establish a PDU session in which the execution of the QoS processing is supported between the UE and the network, based on the information exchanged in the registration procedure in the PDU session establishment procedure. The support information for performing the QoS processing may be support information of multiple user plane radio bearers or may be support information of the establishment of a dedicated bearer. The second procedure may be implemented by a first technique or a second technique.

In the first technique, in a case where the UE supports QoS processing in NB-IoT, the UE may transmit the registration request message including the ninth identification information to the core network in the registration procedure. In a case where the core network supports the QoS processing in the NB-IoT, the core network may transmit the registration request message including the 29th identification information to the UE in the registration procedure.

In the first technique, each of the apparatuses may transmit and/or receive the ninth identification information and/or the 29th identification information to recognize that the QoS processing is also possible in the NB-IoT in addition to recognizing that a procedure of switching from a CP to a UP is possible, recognize that a plurality of user plane radio bearers can be established, or recognize that a plurality of QoS flows can be established in a single PDU session. In the first technique, each of the apparatuses may identify whether a procedure of switching from a CP to a UP is possible or QoS processing is possible according to the type of CIoT 5GS optimization to be used.

For example, in a case where the control plane CIoT 5GS optimization is used, it may be recognized that a procedure of switching from a CP to a UP is possible. Each of the apparatuses may recognize that QoS processing is possible in a case where the user plane CIoT 5GS optimization is used.

In contrast, each of the apparatuses may identify whether a procedure of switching from a CP to a UP is possible or QoS processing is possible, based on other information transmitted and/or received together with the ninth identification information and/or the 29th identification information. The previously-disclosed other information may indicate that any one of the procedures of switching from a CP to a UP or the QoS processing can be performed, or may indicate that both can be performed.

In the second technique, in a case where the UE supports QoS processing in the NB-IoT, the UE may transmit the registration request message including the tenth identification information to the core network in the registration procedure, separate from the ninth identification information. In a case where the core network supports QoS processing in the NB-IoT, the core network may transmit the registration request message including the 30th identification information in the registration procedure, separate from the 29th identification information.

In the second technique, each of the apparatuses may transmit and/or receive the tenth identification information and/or the 30th identification information to recognize that QoS processing is possible also in the NB-IoT, recognize that a plurality of user plane radio bearers can be established, or recognize that a plurality of QoS flows can be established in a single PDU session.

The procedure of switching from a CP to a UP may be a procedure in which a user plane radio bearer is established for a single or a plurality of PDU sessions in a state where the control plane CIoT 5GS optimization is used. The procedure of switching from a CP to a UP may be a procedure implemented by the UE transmitting a service request message to the core network and the core network, having received the service request message, initiatively establishing a user plane radio bearer. The service request message may be a NAS message transmitted and/or received between the UE and the core network. The service request message may include information indicating a request for the establishment of a user plane radio bearer.

The QoS processing may be processing for establishing one or a plurality of QoS flows and/or user data radio bearers and performing the transmission and/or reception of user data using one or a plurality of QoS levels in user data communication. The establishment of the second and subsequent QoS flows and/or user data radio bearers may be performed in a case that a PDU session establishment procedure performed at the time of the establishment of a PDU session is executed, or may be performed in a case that a PDU session modification procedure performed after the establishment of a PDU session is executed. In these cases, a PDU session establishment accept message transmitted and/or received in the PDU session establishment procedure and/or a PDU session modification command message transmitted and/or received in the PDU session modification procedure may include information indicating a QoS rule group including a plurality of QoS rules.

In a case where the UE recognizes that a procedure of switching from a CP to a UP is possible, the UE may perform switching from a CP to a UP based on a request received from a higher layer. The request received from the higher layer may be a request for transmitting and/or receiving user data using a user plane radio bearer.

In a case where the UE determines that the QoS processing is possible, the UE may execute PDU session establishment to establish a PDU session in which the QoS processing is supported. The UE may perform communication of user data using a plurality of QoS levels also in NB-IoT by using the PDU session. In a case where the UE determines that the QoS processing is possible, the UE may update a QoS rule associated with the PDU session by executing the PDU session modification procedure.

According to the previous disclosure, each of the apparatuses can achieve the object by executing the second procedure. The object of the second procedure may be to implement the QoS processing in NB-IoT. The object of the second procedure may be to identify whether or not a procedure of switching from a CP to a UP can be performed and also identify whether or not QoS processing in NB-IoT is possible.

Specifically, the UE may identify whether the state of the UE is a state 1 or a state 2 using the first technique. The UE may identify whether the state of the UE is the state 1, the state 2, or a state 3 by executing the second technique.

The state 1 is a state where procedure switching from a CP to a UP can be performed, and the QoS processing in NB-IoT is possible. The state 2 is a state where procedure switching from a CP to a UP cannot be executed, and the QoS processing in NB-IoT is impossible. The state 3 and the state 2 are states where switching from a CP to a UP can be performed, and the QoS processing in NB-IoT is impossible.

In a case where switching from a CP to a UP and the QoS processing in NB-IoT can be independently executed, the UE may execute the second procedure using the second technique to identify whether the state of the UE is the state 1, the state 2, the state 3, or a state 4. The state 3 and the state 2 may be states where switching from a CP to a UP cannot be executed, and the QoS processing in NB-IoT is possible.

The state where switching from a CP to a UP is possible is a state where previously disclosed switching from a CP to a UP can be performed. The state where switching from a CP to a UP is impossible is a state where the previously-disclosed switching from a CP to a UP cannot be performed.

The state where the QoS processing is possible is a state where the previously-disclosed QoS processing can be performed. The state where the QoS processing is possible may be a state where one or a plurality of QoS flows can be established or a state where one or a plurality of user data radio bearers can be established. The state where the QoS processing is impossible is a state where the previously disclosed QoS processing cannot be performed. The state where the QoS processing is impossible may be a state where two or more QoS flows cannot be established or may be a state where two or more user data radio bearers cannot be established. The state where the QoS processing is impossible may be a state where only one QoS flow can be established or may be a state where only one user data radio bearer can be established.

The previously disclosed registration procedure is the registration procedure disclosed in chapter 3.2.1. The previously disclosed PDU session establishment procedure is the PDU session establishment procedure disclosed in chapter 3.2.2.

4.3. Third Procedure

In the third procedure, the UE performs a registration procedure. Next, the UE performs a PDU session establishment procedure to establish a PDU session and transition to a state where communication using a PDU session can be performed between the UE and the DN. The third procedure is completed via the previously-disclosed processing.

In the third procedure, each of the apparatuses may exchange support information of the CIoT 5GS optimization and/or priority information of the CIoT 5GS optimization between the UE and the network in the registration procedure, or may negotiate the CIoT 5GS optimization to be used. Each of the apparatuses may establish a PDU session in which the CIoT 5GS optimization is supported between the UE and the network, based on the information exchanged in the registration procedure in the PDU session establishment procedure. In the third procedure, each of the apparatuses may negotiate an SSC mode associated with a PDU session to be established in the PDU session establishment procedure.

In the third procedure, CIoT 5GS optimization to be used may be control plane CIoT 5GS optimization. A PDU session in which the CIoT 5GS optimization is supported may be a PDU session in which the control plane CIoT 5GS optimization is supported. The third procedure may be implemented by a first technique, a second technique, a third technique, or a fourth technique.

In the first technique, in a case where the UE uses the control plane CIoT 5GS optimization, the UE may transmit the PDU session establishment request message including the 43rd identification information indicating the SSC mode 1 to the core network in a PDU session establishment procedure. The core network may transmit a PDU session establishment accept message including the 53rd identification information indicating the SSC mode 1 to the UE, based on the reception of the PDU session establishment request message. In the first technique, each of the apparatuses may recognize that an SSC mode associated with a PDU session to be established is the SSC mode 1, or may establish the PDU session associated with the SSC mode 1.

In the second technique, in a case where the UE uses control plane CIoT 5GS optimization, the UE may transmit the PDU session establishment request message including a 43rd identification information indicating any SSC mode to the core network, or may transmit a PDU session establishment request message not including the 43rd identification information to the core network. In a case where the core network has received the 43rd identification information, the core network may ignore the received 43rd identification information. The core network may not newly select an SSC mode associated with a PDU session based on the reception of the PDU session establishment request message. The core network may transmit a PDU session establishment accept message not including the 53rd identification information to the UE or may transmit a PDU session establishment accept message including the 53rd identification information indicating any SSC mode to the UE, based on the reception of the PDU session establishment request message. In the second technique, each of the apparatuses may ignore the 53rd identification information transmitted and/or received. In the case of the second technique, each of the apparatuses may recognize that an SSC mode associated with a PDU session to be established is an SSC mode set in advance, or may establish the PDU session associated with the SSC mode set in advance. The SSC mode set in advance may be an SSC mode previously determined between the UE and the network. For example, the SSC mode set in advance may be the SSC mode 1.

In the third technique, in a case where the UE uses control plane CIoT 5GS optimization, the UE may transmit a PDU session establishment request message including the 43rd identification information indicating any SSC mode to the core network or may transmit a PDU session establishment request message not including the 43rd identification information to the core network. In a case where the core network has received the 43rd identification information, the core network may ignore the received 43rd identification information. The core network may not select an SSC mode associated with a PDU session based on the reception of the PDU session establishment request message. The core network may transmit a PDU session establishment accept message including the 53rd identification information indicating any SSC mode to the UE, based on the reception of the PDU session establishment request message. In the third technique, each of the apparatuses may recognize that an SSC mode is not associated with a PDU session to be established, may ignore the 53rd identification information transmitted and/or received, or may delete an SSC mode from the context of a PDU session to be established.

In the fourth technique, also in a case where the UE uses the control plane CIoT 5GS optimization, the UE may transmit the PDU session establishment request message including the 43rd identification information indicating an appropriate SSC mode to the core network. The core network may determine whether the SSC mode indicated by the 43rd identification information is valid and then transmit the PDU session establishment accept message including the 53rd identification information indicating the same SSC mode as that of the 43rd identification information to the UE. In the fourth technique, each of the apparatuses may recognize that an SSC mode associated with a PDU session to be established is the SSC mode indicated by the 53rd identification information, or may establish the PDU session associated with the SSC mode indicated by the 53rd identification information.

In a case where the UE establishes the PDU session of the SSC mode 1, the UE may continuously maintain the PDU session also in movement across a TA. In a case where the UE establishes the PDU session of the SSC mode 2 and switches an anchor of the PDU session, the UE may cut off the PDU session and then establish a new PDU session to implement service continuity. In a case where the UE establishes the PDU session of the SSC mode 3 and switches an anchor of the PDU session, the UE may establish a new PDU session before cutting off the PDU session to implement service continuity. In a case where the UE establishes a PDU session which is not associated with an SSC mode, the UE may release the PDU session in movement across a TA. In a case where the UE establishes a PDU session which is not associated with an SSC mode, the UE may continuously maintain the PDU session.

In a case where the core network determines that the SSC mode indicated by the 43rd identification information is not valid in a situation where the control plane CIoT 5GS optimization is used in a case of determining whether or not the SSC mode indicated by the 43rd identification information is valid, the core network may transmit a PDU session reject message including a reason value (not supported SSC mode) indicating not being supported to the UE. The UE may initiate a registration procedure in order to stop the use of the control plane CIoT 5GS optimization after receiving the PDU session reject message. The UE may transmit a PDU session establishment request message including the 43rd identification information indicating an SSC mode other than the SSC mode previously transmitted to the core network after receiving the PDU session reject message.

According to the previous disclosure, each of the apparatuses can achieve the object of the third procedure. The object of the third procedure may be to select an SSC mode associated with a PDU session in a case where the control plane CIoT 5GS optimization is used.

Specifically, the UE may execute the first technique to recognize that an SSC mode of a PDU session to be established is the SSC mode 1 or establish the PDU session associated with the SSC mode 1. The UE may execute the second technique to recognize that an SSC mode of a PDU session to be established is an SSC mode set in advance or establish the PDU session associated with the SSC mode set in advance. The UE may execute the third technique to establish a PDU session which is not associated with an SSC mode. The UE may execute the fourth technique to recognize an SSC mode of a PDU session to be established or establish the PDU session associated with the SSC mode 1, the SSC mode 2, or the SSC mode 3.

The registration procedure disclosed previously is the registration procedure disclosed in chapter 3.2.1. The previously disclosed PDU session establishment procedure is the PDU session establishment procedure disclosed in chapter 3.2.2.

4.4. Fourth Procedure

In the fourth procedure, the UE performs a registration procedure. Next, the UE performs a PDU session establishment procedure to establish a PDU session and transition to a state where communication using the PDU session can be performed between the UE and the DN. Next, the UE updates configuration information of the UE via a UE configuration update procedure initiated by the core network. The UE may initiate the registration procedure again after the UE configuration update procedure is completed. Each of the apparatuses may change a function being used in the UE configuration update procedure. The fourth procedure is completed via the previously-disclosed processing.

In the fourth procedure, each of the apparatuses may exchange LADN information between the UE and the network in the registration procedure. Each of the apparatuses may establish a PDU session for an LADN between the UE and the network, based on the information exchanged in the registration procedure in the PDU session establishment procedure.

Each of the apparatuses may update LADN information stored in the UE or change the state of a PDU session for the LADN in the UE configuration update procedure. The change of the state of the PDU session for the LADN may be performed in the registration procedure executed after the UE configuration update procedure is completed. Further, whether the change of the state of the PDU session for the LADN is performed in the UE configuration update procedure or performed in the registration procedure executed after the UE configuration update procedure is completed may be determined according to the transmission and/or reception of the 69th identification information. For example, in a case where information indicating an area in which connection to the LADN included in the LADN information can be performed is updated, the core network may transmit a configuration update command message including the 69th identification information to the UE. Specifically, in a case where a TA is not included in the area in which connection to the LADN can be performed due to the UE being currently positioned, based on the update of the LADN information, the core network may transmit the configuration update command message including the 69th identification information to the UE. The conditions for including the 69th identification information in the configuration update command message may not be limited thereto.

In detail, in a case where the core network updates the LADN information stored in the UE in the UE configuration update procedure, the core network may transmit the 68th identification information included in the configuration update command message to the UE.

In a case where the core network changes the state of the PDU session for the LADN in the UE configuration update procedure, the core network may transmit the configuration update command message including the 68th identification information to the UE.

In a case where the core network changes the state of the PDU session for the LADN by the UE initiating the registration procedure after the UE configuration update procedure is completed, the core network may transmit the configuration update command message including the 69th identification information together with the 68th identification information to the UE.

In a case where the UE has received the 68th identification information in the UE configuration update procedure, the UE may update the LADN information.

In a case where the UE has established the PDU session for the LADN and the UE has received the 68th identification information and has not received the 69th identification information in the UE configuration update procedure, the UE may change the state of the PDU session for the LADN based on the update of the LADN information. In a case where the UE has established the PDU session for the LADN and has received the 69th identification information together with the 68th identification information in the UE configuration update procedure, the UE may initiate the registration procedure in order to change the state of the PDU session for the LADN after the UE configuration update procedure is completed.

The UE may transmit a registration request message including the information received and/or updated in the UE configuration update procedure. The UE may change the state of the PDU session for the LADN based on the execution of the registration procedure.

In a case where the UE has established the PDU session for the LADN, and a TA is not included in the area in which connection to the LADN can be performed due to the UE being currently positioned in association with the update of the LADN information, the UE may initiate the registration procedure in order to change the state of the PDU session for the LADN after the UE configuration update procedure is completed. The UE may transmit the registration request message including the information received and/or updated in the UE configuration update procedure. The UE may transmit the registration request message to the core network in order to synchronize the state of the PDU session with the network, or may initiate the registration procedure by transmitting the registration request message. The UE may transmit the registration request message including the information indicating the state of the established PDU session. The information indicating the state of the PDU session which includes the information indicating the state of the PDU session for the LADN may be transmitted. The UE may synchronize the state of the PDU session with the core network or may change the state of the PDU session for the LADN based on the execution of the registration procedure.

The change of the state of the PDU session for the LADN may mean that each of the apparatuses releases the PDU session for the LADN or may mean that user plane resources of the PDU session for the LADN are invalidated. The UE may release the PDU session for the LADN by executing a network-initiated PDU session release procedure. The UE may recognize that the user plane resources of the PDU session are invalidated based on a notification received from a lower layer, or may invalidate the user plane resources of the PDU session. The change of the state of the PDU session for the LADN may be performed based on the synchronization of the state of the PDU session between the UE and the core network or may be performed after the state of the PDU session is synchronized.

A PDU session establishment procedure for the UE, which is a procedure to establish the PDU session for the LADN, may be prohibited from being initiated after the LADN information is updated. A PDU session modification procedure for the UE to change the PDU session for the LADN may be prohibited from being initiated.

According to the previous disclosure, each of the apparatuses can achieve the object of the fourth procedure. The core network may be able to initiatively achieve the object of the fourth procedure. The core network may be able to achieve the object of the fourth procedure without the need for a trigger of the UE. Each of the apparatuses may be able to achieve the object of the fourth procedure without executing a de-registration procedure. The trigger of the UE may be a request message transmitted from the UE to the core network. For example, the request message transmitted from the UE to the core network may be a registration request message or a service request message.

The object of the fourth procedure may be to update the LADN information stored in the UE or may be to change the state of the PDU session for the LADN.

The previously disclosed registration procedure disclosed is the registration procedure in chapter 3.2.1. The previously disclosed PDU session establishment procedure is the PDU session establishment procedure disclosed in chapter 3.2.2. The previously disclosed UE configuration update procedure is the UE configuration update procedure disclosed in chapter 3.2.3.

5. Modified Examples

A program operated in an apparatus according to the present disclosure may be a program that controls a central processing unit (CPU) and the like to cause a computer to operate in such a manner as to implement the previously-disclosed functions. Programs or information handled by the programs are temporarily stored in a volatile memory such as a random access memory (RAM), a non-volatile memory such as a flash memory, a hard disk drive (HDD), or another storage apparatus system.

A program for implementing such functions of the implementations according to the present disclosure may be recorded on a computer-readable recording medium. The functions may be implemented by causing a computer system to read and execute the program recorded on the recording medium. It is assumed that the "computer system" refers to a computer system built into the apparatus, and the computer system includes an operating system and hardware components such as a peripheral device. The "computer-readable recording medium" may be any of a semiconductor recording medium, an optical recording medium, a magnetic recording medium, a medium dynamically retaining the program for a short period of time, or any of other computer-readable recording media.

Each functional block or various characteristics of the apparatuses used in the present disclosure may be implemented or executed on an electric circuit, for example, an integrated circuit or a plurality of integrated circuits. An electric circuit designed to execute the disclosed functions may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine. The electric circuit may include a digital circuit, or may include an analog circuit. In a case where circuit integration technology that replaces the present integrated circuits appears with advances in semiconductor technology, one or a plurality of aspects of the present disclosure are also possible to use a new integrated circuit based on the technology.

The present disclosure is not limited to the disclosed implementations. In the implementations, apparatuses have been disclosed as an example, but the present disclosure is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The implementations of the present disclosure have been disclosed in detail with reference to the drawings, but the specific configuration is not limited to the implementations and includes, for example, an amendment to a design that falls within the scope that does not depart from the gist of the present disclosure. Various modifications are possible within the scope of the present disclosure defined by claims, and implementations that are made by suitably combining technical means disclosed according to the different implementations are also included in the technical scope of the present disclosure. A configuration in which constituent elements, disclosed in the respective implementations and having mutually the same effects, are substituted for one another is also included in the technical scope of the present disclosure.

REFERENCE SIGNS LIST

1 Mobile communication system
5 PDN_A
6 PDN_A
10 UE_A
30 PGW-U
32 PGW-C
35 SGW
40 MME
50 HSS
60 PCRF
80 Access Network_A (E-UTRAN)
90 Core network_A
120 Access Network_B (5G AN)
130 UPF
132 SMF
140 AMF
150 UDM
160 PCF
190 Core network_B

What is claimed is:

1. A user equipment comprising:
a controller;
a transceiver; and
a storage medium, wherein:
the controller, in a registration procedure,
determines cellular Internet of things 5th generation system optimization (Cellular IoT 5G System optimization (CIoT 5GS optimization)) for use to be control plane CIoT 5GS optimization, with a core network;
the controller, in a Protocol Data Unit (PDU) session establishment procedure performed after completion of the registration procedure, establishes a PDU session with the core network;
the transceiver, in a user equipment (UE) configuration update procedure to be performed after completion of the PDU session establishment procedure,
receives a configuration update command message including information A, from the core network, and transmits a configuration update complete message to the core network;
the controller changes the CIoT 5GS optimization from the control plane CIoT 5GS optimization to user plane CIoT 5GS optimization, based on reception of the configuration update command message; and
the information A is information indicating the user plane CIoT 5GS optimization.

2. The user equipment according to claim 1, wherein:
in the registration procedure, the transceiver further receives a registration accept message including information B from the core network via an access network;
in the PDU session establishment procedure, the controller establishes the PDU session supporting a Quality of Service (QoS) process; and
the information B is information indicating support of the QoS process.

3. The user equipment according to claim 1, wherein,
in the PDU session establishment procedure,
the transceiver receives a PDU session establishment accept message including information C from the core network;
the controller configures a Session and Service Continuity mode (SSC mode) associated with the PDU session to SSC mode 1, based on reception of the PDU session establishment accept message; and
the information C is information indicating SSC mode 1.

4. A control apparatus comprising:
a controller;
a transceiver; and
a storage medium, wherein
the controller, in a registration procedure,
determines cellular Internet of things 5th generation system optimization (Cellular IoT 5G System optimization (CIoT 5GS optimization)) for use to be control plane CIoT 5GS optimization, with a user equipment (UE);
the controller, in a Protocol Data Unit (PDU) session establishment procedure to be performed after completion of the registration procedure, establishes a PDU session with the user equipment UE;
the transceiver, in a UE configuration update procedure to be performed after completion of the PDU session establishment procedure,
transmits a configuration update command message including information A, to the UE; and
receives a configuration update complete message from the UE;
the controller changes the CIoT 5GS optimization from the control plane CIoT 5GS optimization to user plane CIoT 5GS optimization, based on reception of the configuration update complete message; and
the information A is information indicating the user plane CIoT 5GS optimization.

5. The control apparatus according to claim 4, wherein:
in the registration procedure, the transceiver further transmits a registration accept message including information B to the UE via an access network;
in the PDU session establishment procedure, the controller establishes the PDU session supporting a Quality of Service (QoS) process; and
the information B is information indicating support of the QoS process.

6. The control apparatus according to claim 4, wherein:
in the PDU session establishment procedure,
the controller determines a Session and Service Continuity mode (SSC mode) associated with the PDU session to SSC mode 1;
the transceiver transmits a PDU session establishment accept message including information C to the user equipment; and the information C is information indicating SSC mode 1.

7. A communication control method for a user equipment (UE), the communication control method comprising:
- in a registration procedure, determining cellular Internet of things 5th generation system optimization (Cellular IoT 5G System optimization (CIoT 5GS optimization)) for use to be control plane CIoT 5GS optimization, with a core network;
- in a Protocol Data Unit (PDU) session establishment procedure, establishing a PDU session with the core network performed after completion of the registration procedure;
- in a UE configuration update procedure performed after completion of the PDU session establishment procedure,
- receiving a configuration update command message including information A, from the core network and
- transmitting a configuration update complete message to the core network; and
- changing the CIoT 5GS optimization from the control plane CIoT 5GS optimization to the user plane CIoT 5GS optimization, based on reception of the configuration update command message, wherein
- the information A is information indicating the user plane CIoT 5GS optimization.

8. The communication control method according to claim 7, further comprising:
- in the registration procedure, receiving a registration accept message including information B from the core network via an access network; and
- in the PDU session establishment procedure performed after completion of the registration procedure, establishing the PDU session supporting a Quality of Service (QoS) process, wherein
- the information B is information indicating support of the QoS process.

9. The communication control method according to claim 7, further comprising:
- in the PDU session establishment procedure,
- receiving a PDU session establishment accept message including information C from the core network; and
- configuring a Session and Service Continuity mode (SSC mode) associated with the PDU session to SSC mode 1, based on reception of the PDU session establishment accept message, wherein
- the information C is information indicating SSC mode 1.

10. A communication control method for a control apparatus, the communication control method comprising:
- in a registration procedure, determining cellular Internet of things 5th generation system optimization (Cellular IoT 5G System optimization (CIoT 5GS optimization)) for use to be control plane CIoT 5GS optimization, with a user equipment (UE);
- in a Protocol Data Unit (PDU) session establishment procedure, establishing a PDU session with the UE;
- in a UE configuration update procedure performed after completion of the PDU session establishment procedure,
- transmitting a configuration update command message including information A, to the UE, and
- receiving a configuration update complete message from the UE; and
- changing the CIoT 5GS optimization from the control plane CIoT 5GS optimization to user plane CIoT 5GS optimization, based on reception of the configuration update complete message, wherein
- the information A is information indicating the user plane CIoT 5GS optimization.

11. The communication control method according to claim 10, further comprising:
- in the registration procedure, transmitting a registration accept message including information B to the UE via an access network; and
- in the PDU session establishment procedure, establishing the PDU session supporting a Quality of Service (QoS) process, wherein
- the information B is information indicating support of the QoS process.

12. The communication control method according to claim 10, further comprising:
- in the PDU session establishment procedure,
- determining a Session and Service Continuity mode (SSC mode) associated with the PDU session to SSC mode 1; and
- transmitting a PDU session establishment accept message including information C to the UE, wherein
- the information C is information indicating SSC mode 1.

* * * * *